United States Patent
Raad et al.

(10) Patent No.: US 10,005,492 B2
(45) Date of Patent: Jun. 26, 2018

(54) TRAILER LENGTH AND HITCH ANGLE BIAS ESTIMATION

(71) Applicant: Ford Global Technologies, LLC, Dearborn, MI (US)

(72) Inventors: Joseph M. Raad, Farmington, MI (US); Christos Kyrtsos, Beverly Hills, MI (US); Tyler Daavettila, Howell, MI (US); Donald Jacob Mattern, Canton, MI (US); Erick Michael Lavoie, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 85 days.

(21) Appl. No.: 15/046,531

(22) Filed: Feb. 18, 2016

(65) Prior Publication Data

US 2017/0240204 A1 Aug. 24, 2017

(51) Int. Cl.
| | |
|---|---|
| A01B 69/00 | (2006.01) |
| B62D 15/02 | (2006.01) |
| B62D 13/06 | (2006.01) |
| G01B 21/22 | (2006.01) |

(52) U.S. Cl.
CPC ........... *B62D 15/025* (2013.01); *B62D 13/06* (2013.01); *B62D 15/021* (2013.01); *G01B 21/22* (2013.01)

(58) Field of Classification Search
CPC .... B62D 15/025; B62D 13/06; B62D 15/021; G01B 21/22
USPC ........................ 701/36, 41; 340/431; 303/123
See application file for complete search history.

(56) References Cited

U.S. PATENT DOCUMENTS

| | | |
|---|---|---|
| 3,542,390 A | 11/1970 | Fikes et al. |
| 3,605,088 A | 9/1971 | Savelli |
| 3,787,077 A | 1/1974 | Sanders |
| 3,833,928 A | 9/1974 | Gavit et al. |
| 3,860,257 A | 1/1975 | Mesley |
| 4,040,006 A | 8/1977 | Kimmel |
| 4,042,132 A | 8/1977 | Bohman et al. |

(Continued)

FOREIGN PATENT DOCUMENTS

| | | |
|---|---|---|
| CN | 102582686 B | 9/2013 |
| DE | 3923676 A1 | 1/1991 |

(Continued)

OTHER PUBLICATIONS

Novak, Domen; Dovzan, Dejan; Grebensek, Rok; Oblak, Simon, "Automated Parking System for a Truck and Trailer", International Conference on Advances in the Internet, Processing, Systems and Interdisciplinary Research, Florence, 2007, WorldCat.org, 13 pgs.

(Continued)

*Primary Examiner* — Gertrude Arthur Jeanglaude
(74) *Attorney, Agent, or Firm* — Frank MacKenzie; Price Heneveld LLP

(57) ABSTRACT

A backup assist system for a vehicle and trailer combination includes a steering system and a first sensor detecting a first dynamic condition of the combination. The system further includes a controller receiving a value for the first dynamic condition from the first sensor at a plurality of instances. The controller further solves for a corresponding plurality of parameters in a kinematic model of the combination and controls the steering system using the plurality of parameters in the kinematic model.

20 Claims, 13 Drawing Sheets

(56) References Cited

U.S. PATENT DOCUMENTS

| | | |
|---|---|---|
| 4,122,390 A | 10/1978 | Kollitz et al. |
| 4,212,483 A | 7/1980 | Howard |
| 4,366,966 A | 1/1983 | Ratsko et al. |
| 4,727,419 A | 2/1988 | Yamada et al. |
| 4,735,432 A | 4/1988 | Brown |
| 4,752,080 A | 6/1988 | Rogers |
| 4,778,060 A | 10/1988 | Wessner, Jr. |
| 4,848,449 A | 7/1989 | Martinet et al. |
| 4,852,901 A | 8/1989 | Beasley et al. |
| 4,943,080 A | 7/1990 | Reimer |
| 5,001,639 A | 3/1991 | Breen |
| 5,056,905 A | 10/1991 | Jensen |
| 5,097,250 A | 3/1992 | Hernandez |
| 5,108,123 A | 4/1992 | Rubenzik |
| 5,108,158 A | 4/1992 | Breen |
| 5,132,851 A | 7/1992 | Bomar et al. |
| 5,152,544 A | 10/1992 | Dierker, Jr. et al. |
| 5,191,328 A | 3/1993 | Nelson |
| 5,244,226 A | 9/1993 | Bergh |
| 5,246,242 A | 9/1993 | Penzotti |
| 5,247,442 A | 9/1993 | Kendall |
| 5,282,641 A | 2/1994 | McLaughlin |
| 5,289,892 A | 3/1994 | Notsu |
| 5,290,057 A | 3/1994 | Pellerito |
| 5,455,557 A | 10/1995 | Noll et al. |
| 5,521,633 A | 5/1996 | Nakajima et al. |
| 5,523,947 A | 6/1996 | Breen |
| 5,541,778 A | 7/1996 | DeFlorio |
| 5,558,350 A | 9/1996 | Kimbrough et al. |
| 5,559,696 A | 9/1996 | Berenstein |
| 5,579,228 A | 11/1996 | Kimbrough et al. |
| 5,631,656 A | 5/1997 | Hartman et al. |
| 5,650,764 A | 7/1997 | McCullough |
| 5,690,347 A | 11/1997 | Juergens et al. |
| 5,719,713 A | 2/1998 | Brown |
| 5,747,683 A | 5/1998 | Gerum et al. |
| 5,821,852 A | 10/1998 | Fairchild |
| 5,980,048 A | 11/1999 | Rannells, Jr. et al. |
| 6,041,582 A | 3/2000 | Tiede et al. |
| 6,042,196 A | 3/2000 | Nakamura et al. |
| 6,124,709 A | 9/2000 | Allwine |
| 6,151,175 A | 11/2000 | Osha |
| 6,198,992 B1 | 3/2001 | Winslow |
| 6,217,177 B1 | 4/2001 | Rost |
| 6,218,828 B1 | 4/2001 | Bates et al. |
| 6,223,104 B1 | 4/2001 | Kamen et al. |
| 6,223,114 B1 | 4/2001 | Boras et al. |
| 6,268,800 B1 | 7/2001 | Howard |
| 6,292,094 B1 | 9/2001 | Deng et al. |
| 6,301,548 B1 | 10/2001 | Gerum |
| 6,351,698 B1 | 2/2002 | Kubota et al. |
| 6,472,865 B1 | 10/2002 | Tola et al. |
| 6,480,104 B1 | 11/2002 | Wall et al. |
| 6,483,429 B1 | 11/2002 | Yasui et al. |
| 6,494,476 B2 | 12/2002 | Masters et al. |
| 6,498,977 B2 | 12/2002 | Wetzel et al. |
| 6,539,288 B2 | 3/2003 | Ishida et al. |
| 6,568,093 B2 | 5/2003 | Kogiso et al. |
| 6,577,952 B2 | 6/2003 | Geier et al. |
| 6,668,225 B2 | 12/2003 | Oh et al. |
| 6,704,653 B2 | 3/2004 | Kuriya et al. |
| 6,712,378 B1 | 3/2004 | Austin |
| 6,801,125 B1 | 10/2004 | McGregor et al. |
| 6,806,809 B2 | 10/2004 | Lee et al. |
| 6,820,888 B1 | 11/2004 | Griffin |
| 6,838,979 B2 | 1/2005 | Deng et al. |
| 6,854,557 B1 | 2/2005 | Deng et al. |
| 6,857,494 B2 | 2/2005 | Kobayashi et al. |
| 6,879,240 B2 | 4/2005 | Kruse |
| 6,956,468 B2 | 10/2005 | Lee et al. |
| 6,959,970 B2 | 11/2005 | Tseng |
| 6,999,856 B2 | 2/2006 | Lee et al. |
| 7,005,974 B2 | 2/2006 | McMahon et al. |
| 7,006,127 B2 | 2/2006 | Mizusawa et al. |
| 7,008,088 B2 | 3/2006 | Pisciotti |
| 7,028,804 B2 | 4/2006 | Eki et al. |
| 7,032,705 B2 | 4/2006 | Zheng et al. |
| 7,046,127 B2 | 5/2006 | Boddy |
| 7,058,493 B2 | 6/2006 | Inagaki |
| 7,089,101 B2 | 8/2006 | Fischer et al. |
| 7,154,385 B2 | 12/2006 | Lee et al. |
| 7,159,890 B2 | 1/2007 | Craig et al. |
| 7,167,785 B2 | 1/2007 | Lohberg et al. |
| 7,170,285 B2 | 1/2007 | Spratte |
| 7,171,330 B2 | 1/2007 | Kruse et al. |
| 7,204,504 B2 | 4/2007 | Gehring et al. |
| 7,219,913 B2 | 5/2007 | Atley |
| 7,225,891 B2 | 6/2007 | Gehring et al. |
| 7,229,139 B2 | 6/2007 | Lu et al. |
| 7,239,958 B2 | 7/2007 | Grougan et al. |
| 7,269,489 B2 | 9/2007 | Deng et al. |
| 7,272,481 B2 | 9/2007 | Einig et al. |
| 7,295,907 B2 | 11/2007 | Lu et al. |
| 7,401,871 B2 | 7/2008 | Lu et al. |
| 7,405,557 B2 | 7/2008 | Spratte et al. |
| 7,413,266 B2 | 8/2008 | Lenz et al. |
| 7,425,889 B2 | 9/2008 | Widmann et al. |
| 7,447,585 B2 | 11/2008 | Tandy, Jr. et al. |
| 7,451,020 B2 | 11/2008 | Goetting et al. |
| 7,463,137 B2 | 12/2008 | Wishart et al. |
| 7,504,995 B2 | 3/2009 | Lawrence et al. |
| 7,532,109 B2 | 5/2009 | Takahama et al. |
| 7,540,523 B2 | 6/2009 | Russell et al. |
| 7,548,155 B2 | 6/2009 | Schutt et al. |
| 7,568,716 B2 | 8/2009 | Dietz |
| 7,623,952 B2 | 11/2009 | Unruh et al. |
| 7,648,153 B2 | 1/2010 | Metternich et al. |
| 7,690,737 B2 | 4/2010 | Lu |
| 7,715,953 B2 | 5/2010 | Shepard |
| 7,731,302 B2 | 6/2010 | Tandy, Jr. et al. |
| 7,793,965 B2 | 9/2010 | Padula |
| 7,798,263 B2 | 9/2010 | Tandy, Jr. et al. |
| 7,878,545 B2 | 2/2011 | Rhymer et al. |
| 7,904,222 B2 | 3/2011 | Lee et al. |
| 7,905,507 B2 | 3/2011 | Perri |
| 7,950,751 B2 | 5/2011 | Offerle et al. |
| 7,953,536 B2 | 5/2011 | Katrak |
| 7,974,444 B2 | 7/2011 | Hongo |
| 8,010,252 B2 | 8/2011 | Getman et al. |
| 8,010,253 B2 | 8/2011 | Lundquist |
| 8,036,792 B2 | 10/2011 | Dechamp |
| 8,038,166 B1 | 10/2011 | Piesinger |
| 8,044,779 B2 | 10/2011 | Hahn et al. |
| 8,073,594 B2 | 12/2011 | Lee et al. |
| 8,157,284 B1 | 4/2012 | McGhie et al. |
| 8,165,770 B2 | 4/2012 | Getman et al. |
| 8,167,444 B2 | 5/2012 | Lee et al. |
| 8,170,726 B2 | 5/2012 | Chen et al. |
| 8,174,576 B2 | 5/2012 | Akatsuka et al. |
| 8,180,543 B2 | 5/2012 | Futamura et al. |
| 8,190,364 B2 | 5/2012 | Rekow |
| 8,191,915 B2 | 6/2012 | Freese, V et al. |
| 8,192,036 B2 | 6/2012 | Lee et al. |
| 8,215,436 B2 | 7/2012 | DeGrave et al. |
| 8,223,204 B2 | 7/2012 | Hahn |
| 8,244,442 B2 | 8/2012 | Craig et al. |
| 8,260,518 B2 | 9/2012 | Englert |
| 8,267,485 B2 | 9/2012 | Barlsen et al. |
| 8,280,607 B2 | 10/2012 | Gatti et al. |
| 8,308,182 B2 | 11/2012 | Ortmann et al. |
| 8,326,504 B2 | 12/2012 | Vvu et al. |
| 8,342,560 B2 | 1/2013 | Albers et al. |
| 8,380,390 B2 | 2/2013 | Sy et al. |
| 8,380,416 B2 | 2/2013 | Offerle et al. |
| 8,393,632 B2 | 3/2013 | Vortmeyer et al. |
| 8,401,744 B2 | 3/2013 | Chiocco |
| 8,427,288 B2 | 4/2013 | Schofield et al. |
| 8,469,125 B2 | 6/2013 | Yu et al. |
| 8,498,757 B2 | 7/2013 | Bowden et al. |
| 8,504,243 B2 | 8/2013 | Kageyama |
| 8,547,401 B2 | 10/2013 | Mallinson et al. |
| 8,548,680 B2 | 10/2013 | Ryerson et al. |
| 8,548,683 B2 | 10/2013 | Cebon et al. |
| 8,571,777 B2 | 10/2013 | Greene |

(56) References Cited

U.S. PATENT DOCUMENTS

| | | |
|---|---|---|
| 8,576,115 B2 | 11/2013 | Basten |
| 8,626,382 B2 | 1/2014 | Obradovich |
| 8,675,953 B1 | 3/2014 | Elwell et al. |
| 8,755,984 B2 | 6/2014 | Rupp et al. |
| 8,807,261 B2 | 8/2014 | Subrt et al. |
| 8,811,698 B2 | 8/2014 | Kona et al. |
| 8,825,328 B2 | 9/2014 | Rupp et al. |
| 8,833,789 B2 | 9/2014 | Anderson |
| 8,886,400 B2 | 11/2014 | Kossira et al. |
| 8,888,120 B2 | 11/2014 | Trevino |
| 8,909,426 B2 | 12/2014 | Rhode et al. |
| 8,930,140 B2 | 1/2015 | Trombley et al. |
| 8,939,462 B2 | 1/2015 | Adamczyk et al. |
| 8,955,865 B2 | 2/2015 | Fortin et al. |
| 8,972,109 B2 | 3/2015 | Lavoie et al. |
| 9,008,913 B1 | 4/2015 | Sears et al. |
| 9,026,311 B1 | 5/2015 | Pieronek et al. |
| 9,042,603 B2 | 5/2015 | Elwart et al. |
| 9,082,315 B2 | 7/2015 | Lin et al. |
| 9,102,271 B2 | 8/2015 | Trombley et al. |
| 9,108,598 B2 | 8/2015 | Headley |
| 9,114,832 B2 | 8/2015 | Wang et al. |
| 9,120,358 B2 | 9/2015 | Motts et al. |
| 9,120,359 B2 | 9/2015 | Chiu et al. |
| 9,132,856 B2 | 9/2015 | Shepard |
| 9,156,496 B2 | 10/2015 | Greenwood et al. |
| 9,164,955 B2 | 10/2015 | Lavoie et al. |
| 9,180,890 B2 | 11/2015 | Lu et al. |
| 9,187,124 B2 | 11/2015 | Trombley et al. |
| 9,227,474 B2 | 1/2016 | Liu |
| 9,238,483 B2 | 1/2016 | Hafner et al. |
| 9,248,858 B2 | 2/2016 | Lavoie et al. |
| 9,315,212 B1 | 4/2016 | Kyrtsos et al. |
| 9,321,483 B2 | 4/2016 | Headley |
| 9,335,162 B2 | 5/2016 | Kyrtsos et al. |
| 9,340,228 B2 | 5/2016 | Xu et al. |
| 9,352,777 B2 | 5/2016 | Lavoie et al. |
| 9,393,996 B2 | 7/2016 | Goswami et al. |
| 9,434,414 B2 | 9/2016 | Lavoie |
| 9,493,187 B2 * | 11/2016 | Pilutti |
| 9,500,497 B2 | 11/2016 | Lavoie |
| 2001/0024333 A1 | 9/2001 | Rost |
| 2001/0037164 A1 | 11/2001 | Hecker |
| 2002/0128764 A1 | 9/2002 | Hecker et al. |
| 2004/0017285 A1 | 1/2004 | Zielinski et al. |
| 2004/0021291 A1 | 2/2004 | Haug et al. |
| 2004/0093139 A1 | 5/2004 | Wildey et al. |
| 2004/0130441 A1 | 7/2004 | Lee et al. |
| 2004/0222881 A1 | 11/2004 | Deng et al. |
| 2005/0000738 A1 | 1/2005 | Gehring et al. |
| 2005/0074143 A1 | 4/2005 | Kawai |
| 2005/0128059 A1 | 6/2005 | Vause |
| 2005/0206224 A1 | 9/2005 | Lu |
| 2005/0206225 A1 | 9/2005 | Offerle et al. |
| 2005/0206229 A1 | 9/2005 | Lu et al. |
| 2005/0206231 A1 | 9/2005 | Lu et al. |
| 2005/0236201 A1 | 10/2005 | Spannheimer et al. |
| 2005/0236896 A1 | 10/2005 | Offerle et al. |
| 2006/0041358 A1 | 2/2006 | Hara |
| 2006/0071447 A1 | 4/2006 | Gehring et al. |
| 2006/0076828 A1 | 4/2006 | Lu et al. |
| 2006/0103511 A1 | 5/2006 | Lee et al. |
| 2006/0111820 A1 | 5/2006 | Goetting et al. |
| 2006/0142936 A1 | 6/2006 | Dix |
| 2006/0155455 A1 | 7/2006 | Lucas et al. |
| 2006/0244579 A1 | 11/2006 | Raab |
| 2007/0027581 A1 | 2/2007 | Bauer et al. |
| 2007/0090688 A1 | 4/2007 | Haemmerling et al. |
| 2007/0132560 A1 | 6/2007 | Nystrom et al. |
| 2007/0152424 A1 | 7/2007 | Deng et al. |
| 2007/0285808 A1 | 12/2007 | Beale |
| 2008/0143593 A1 | 6/2008 | Graziano et al. |
| 2008/0147277 A1 | 6/2008 | Lu et al. |
| 2008/0231701 A1 | 9/2008 | Greenwood et al. |
| 2008/0312792 A1 | 12/2008 | Dechamp |
| 2009/0005932 A1 | 1/2009 | Lee et al. |
| 2009/0079828 A1 | 3/2009 | Lee et al. |
| 2009/0085775 A1 | 4/2009 | Otsuka et al. |
| 2009/0093928 A1 | 4/2009 | Getman et al. |
| 2009/0198425 A1 | 8/2009 | Englert |
| 2009/0228182 A1 | 9/2009 | Waldbauer et al. |
| 2009/0248346 A1 | 10/2009 | Fennel et al. |
| 2009/0280859 A1 | 11/2009 | Bergh |
| 2009/0300701 A1 | 12/2009 | Karaoguz et al. |
| 2009/0306861 A1 | 12/2009 | Schumann et al. |
| 2010/0063702 A1 | 3/2010 | Sabelstrom et al. |
| 2010/0171828 A1 | 7/2010 | Ishii |
| 2010/0272370 A1 | 10/2010 | Schilling et al. |
| 2010/0332049 A1 | 12/2010 | Sy et al. |
| 2011/0001825 A1 | 1/2011 | Hahn |
| 2011/0018231 A1 | 1/2011 | Collenberg |
| 2011/0022282 A1 | 1/2011 | Wu et al. |
| 2011/0087398 A1 | 4/2011 | Lu et al. |
| 2011/0112721 A1 | 5/2011 | Wang et al. |
| 2011/0125457 A1 | 5/2011 | Lee et al. |
| 2011/0160956 A1 | 6/2011 | Chung et al. |
| 2011/0181457 A1 | 7/2011 | Basten |
| 2011/0257860 A1 | 10/2011 | Getman et al. |
| 2012/0041658 A1 | 2/2012 | Turner |
| 2012/0086808 A1 | 4/2012 | Lynam et al. |
| 2012/0095649 A1 | 4/2012 | Klier et al. |
| 2012/0109471 A1 | 5/2012 | Wu |
| 2012/0112434 A1 | 5/2012 | Albers et al. |
| 2012/0185131 A1 | 7/2012 | Headley |
| 2012/0200706 A1 | 8/2012 | Greenwood et al. |
| 2012/0221168 A1 | 8/2012 | Zeng et al. |
| 2012/0271512 A1 | 10/2012 | Rupp et al. |
| 2012/0271514 A1 | 10/2012 | Lavoie et al. |
| 2012/0271515 A1 | 10/2012 | Rhode et al. |
| 2012/0271522 A1 | 10/2012 | Rupp et al. |
| 2012/0283909 A1 | 11/2012 | Dix |
| 2012/0283910 A1 | 11/2012 | Lee et al. |
| 2012/0310594 A1 | 12/2012 | Watanabe |
| 2013/0006472 A1 | 1/2013 | McClain et al. |
| 2013/0024064 A1 | 1/2013 | Shepard |
| 2013/0027195 A1 | 1/2013 | Van Wiemeersch et al. |
| 2013/0082453 A1 | 4/2013 | Padula |
| 2013/0158863 A1 | 6/2013 | Skvarce et al. |
| 2013/0179038 A1 | 7/2013 | Goswami et al. |
| 2013/0207834 A1 | 8/2013 | Mizutani et al. |
| 2013/0226390 A1 | 8/2013 | Luo et al. |
| 2013/0250114 A1 | 9/2013 | Lu |
| 2013/0261843 A1 | 10/2013 | Kossira et al. |
| 2013/0268160 A1 | 10/2013 | Trombley et al. |
| 2013/0321347 A1 | 12/2013 | Kim |
| 2014/0005918 A1 | 1/2014 | Qiang |
| 2014/0012465 A1 | 1/2014 | Shank et al. |
| 2014/0025260 A1 | 1/2014 | McClure |
| 2014/0052337 A1 | 2/2014 | Lavoie et al. |
| 2014/0058614 A1 | 2/2014 | Trombley et al. |
| 2014/0058622 A1 | 2/2014 | Trombley et al. |
| 2014/0058655 A1 | 2/2014 | Trombley et al. |
| 2014/0058668 A1 | 2/2014 | Trombley et al. |
| 2014/0067154 A1 | 3/2014 | Yu et al. |
| 2014/0067155 A1 | 3/2014 | Yu et al. |
| 2014/0085472 A1 | 3/2014 | Lu et al. |
| 2014/0088824 A1 | 3/2014 | Ishimoto |
| 2014/0160276 A1 | 6/2014 | Pliefke et al. |
| 2014/0172232 A1 | 6/2014 | Rupp et al. |
| 2014/0183841 A1 | 7/2014 | Jones |
| 2014/0188344 A1 | 7/2014 | Lavoie |
| 2014/0188346 A1 | 7/2014 | Lavoie |
| 2014/0210456 A1 | 7/2014 | Crossman |
| 2014/0218506 A1 | 8/2014 | Trombley et al. |
| 2014/0218522 A1 | 8/2014 | Lavoie et al. |
| 2014/0222288 A1 | 8/2014 | Lavoie et al. |
| 2014/0236532 A1 | 8/2014 | Trombley et al. |
| 2014/0249691 A1 | 9/2014 | Hafner et al. |
| 2014/0267688 A1 | 9/2014 | Aich et al. |
| 2014/0267689 A1 | 9/2014 | Lavoie |
| 2014/0277941 A1 | 9/2014 | Chiu et al. |
| 2014/0277942 A1 | 9/2014 | Kyrtsos et al. |
| 2014/0297128 A1 | 10/2014 | Lavoie et al. |
| 2014/0297129 A1 | 10/2014 | Lavoie et al. |

(56) References Cited

U.S. PATENT DOCUMENTS

| | | |
|---|---|---|
| 2014/0303847 A1 | 10/2014 | Lavoie |
| 2014/0309888 A1 | 10/2014 | Smit et al. |
| 2014/0324295 A1 | 10/2014 | Lavoie |
| 2014/0343795 A1 | 11/2014 | Lavoie |
| 2014/0358429 A1 | 12/2014 | Shutko et al. |
| 2014/0379217 A1 | 12/2014 | Rupp et al. |
| 2015/0002670 A1 | 1/2015 | Bajpai |
| 2015/0035256 A1 | 2/2015 | Klank et al. |
| 2015/0057903 A1 | 2/2015 | Rhode et al. |
| 2015/0066296 A1 | 3/2015 | Trombley et al. |
| 2015/0066298 A1 | 3/2015 | Sharma et al. |
| 2015/0105975 A1 | 4/2015 | Dunn |
| 2015/0115571 A1 | 4/2015 | Zhang et al. |
| 2015/0120141 A1 | 4/2015 | Lavoie et al. |
| 2015/0120143 A1 | 4/2015 | Schlichting |
| 2015/0134183 A1 | 5/2015 | Lavoie et al. |
| 2015/0138340 A1 | 5/2015 | Lavoie |
| 2015/0149040 A1 | 5/2015 | Hueger et al. |
| 2015/0158527 A1 | 6/2015 | Hafner et al. |
| 2015/0165850 A1 | 6/2015 | Chiu et al. |
| 2015/0197278 A1 | 7/2015 | Boos et al. |
| 2015/0203156 A1* | 7/2015 | Hafner ............... B62D 13/06 701/36 |
| 2015/0210254 A1 | 7/2015 | Pieronek et al. |
| 2015/0210317 A1 | 7/2015 | Hafner et al. |
| 2015/0217693 A1 | 8/2015 | Pliefke et al. |
| 2015/0269444 A1 | 9/2015 | Lameyre et al. |
| 2016/0001705 A1 | 1/2016 | Greenwood et al. |
| 2016/0009288 A1 | 1/2016 | Yu |
| 2016/0039456 A1 | 2/2016 | Lavoie et al. |
| 2016/0059780 A1 | 3/2016 | Lavoie |
| 2016/0059888 A1 | 3/2016 | Bradley et al. |
| 2016/0059889 A1 | 3/2016 | Herzog et al. |
| 2016/0096549 A1 | 4/2016 | Herzog et al. |
| 2016/0129939 A1 | 5/2016 | Singh et al. |
| 2016/0152263 A1 | 6/2016 | Singh et al. |
| 2016/0153778 A1 | 6/2016 | Singh et al. |
| 2016/0229452 A1 | 8/2016 | Lavoie et al. |
| 2016/0280267 A1 | 9/2016 | Lavoie et al. |

FOREIGN PATENT DOCUMENTS

| | | |
|---|---|---|
| DE | 3931518 A1 | 4/1991 |
| DE | 9208595 U1 | 8/1992 |
| DE | 19526702 A1 | 2/1997 |
| DE | 10030738 C1 | 8/2001 |
| DE | 10031244 A1 | 1/2002 |
| DE | 10065230 A1 | 7/2002 |
| DE | 10122562 C1 | 7/2002 |
| DE | 10154612 A1 | 5/2003 |
| DE | 10312548 B3 | 5/2004 |
| DE | 10333998 A1 | 2/2005 |
| DE | 102004050149 A1 | 4/2006 |
| DE | 102005042957 A1 | 3/2007 |
| DE | 102005043466 A1 | 3/2007 |
| DE | 102005043467 A1 | 3/2007 |
| DE | 102005043468 A1 | 3/2007 |
| DE | 102006002294 A1 | 7/2007 |
| DE | 102006048947 A1 | 4/2008 |
| DE | 102006056408 A1 | 6/2008 |
| DE | 102008020838 A1 | 11/2008 |
| DE | 102007029413 A1 | 1/2009 |
| DE | 102008045436 A1 | 3/2010 |
| DE | 102006035021 | 4/2010 |
| DE | 102006035021 B4 | 4/2010 |
| DE | 102008043675 A1 | 5/2010 |
| DE | 102009007990 A1 | 8/2010 |
| DE | 102009012253 A1 | 9/2010 |
| DE | 102009027041 A1 | 12/2010 |
| DE | 102009038552 A1 | 2/2011 |
| DE | 102010006323 A1 | 8/2011 |
| DE | 102008004158 B4 | 10/2011 |
| DE | 102008004159 B4 | 10/2011 |
| DE | 102008004160 B4 | 10/2011 |
| DE | 102010021052 A1 | 11/2011 |
| DE | 102010029184 A1 | 11/2011 |
| DE | 102010045519 A1 | 3/2012 |
| DE | 102011104256 A1 | 7/2012 |
| DE | 102011101990 B3 | 10/2012 |
| DE | 102012005707 A1 | 10/2012 |
| DE | 202012010517 U | 12/2012 |
| DE | 102011108440 A1 | 1/2013 |
| DE | 102011120814 A1 | 6/2013 |
| DE | 102012006206 A1 | 10/2013 |
| DE | 102012206133 A1 | 10/2013 |
| DE | 102012019234 A1 | 4/2014 |
| DE | 102013000198 A1 | 7/2014 |
| EP | 0418653 A1 | 3/1991 |
| EP | 0433858 A2 | 6/1991 |
| EP | 1361543 A2 | 11/2003 |
| EP | 1593552 B1 | 3/2007 |
| EP | 1593552 B2 | 3/2007 |
| EP | 1810913 A1 | 7/2007 |
| EP | 2388180 A2 | 11/2011 |
| EP | 2452549 A1 | 5/2012 |
| EP | 2487454 A2 | 8/2012 |
| EP | 2551132 A1 | 1/2013 |
| EP | 2644477 A1 | 10/2013 |
| EP | 2803944 A2 | 11/2014 |
| FR | 2515379 A1 | 4/1983 |
| GB | 2265587 A | 10/1993 |
| GB | 2342630 A | 4/2000 |
| GB | 2398048 A | 8/2004 |
| GB | 2398049 A | 8/2004 |
| GB | 2398050 A | 8/2004 |
| JP | 61006458 | 1/1986 |
| JP | 6159491 A | 3/1986 |
| JP | 6385568 U | 6/1988 |
| JP | 01095980 A | 4/1989 |
| JP | 01095981 A | 4/1989 |
| JP | 09267762 A | 10/1997 |
| JP | 09328078 A | 12/1997 |
| JP | 10001063 A | 1/1998 |
| JP | 11124051 A | 5/1999 |
| JP | 11278319 A | 10/1999 |
| JP | 2002012172 A | 1/2002 |
| JP | 2002068032 A | 3/2002 |
| JP | 2003034261 A | 2/2003 |
| JP | 2003148938 A | 5/2003 |
| JP | 3716722 B2 | 11/2005 |
| JP | 2008027138 A1 | 2/2008 |
| JP | 2012105158 A | 5/2012 |
| JP | 2012166647 A | 9/2012 |
| JP | 2014002056 A | 1/2014 |
| WO | 8503263 A1 | 8/1985 |
| WO | 0044605 A1 | 8/2000 |
| WO | 2005005200 A2 | 1/2005 |
| WO | 2005116688 A2 | 12/2005 |
| WO | 2006042665 A1 | 4/2006 |
| WO | 2012059207 A1 | 5/2012 |
| WO | 2012103193 A1 | 8/2012 |
| WO | 2014019730 A1 | 2/2014 |
| WO | 2014037500 A1 | 3/2014 |
| WO | 2014070047 A1 | 5/2014 |
| WO | 2014092611 A1 | 6/2014 |
| WO | 2014123575 A1 | 8/2014 |
| WO | 2015074027 A1 | 5/2015 |
| WO | 2015187467 A1 | 12/2015 |

OTHER PUBLICATIONS

SH. Azadi, H.R. Rezaei Nedamani, and R. Kazemi, "Automatic Parking of an Articulated Vehicle Using ANFIS", Global Journal of Science, Engineering and Technology (ISSN: 2322-2441), 2013, pp. 93-104, Issue No. 14.

F. Cuesta and A. Ollero, "Intelligent System for Parallel Parking of Cars and Tractor-Trailers", Intelligent Mobile Robot Navigation, STAR, 2005, pp. 159-188, Springer-Verlag Berlin Heidelberg.

Olof Enqvist, "AFS-Assisted Trailer Reversing," Institutionen för systemteknik Deartment of Electrical Engineering, Jan. 27, 2006, pp. 1-57.

(56) References Cited

OTHER PUBLICATIONS

"Ford Super Duty: Truck Technologies", Brochure, Sep. 2011, 2 pages.
Kristopher Bunker, "2012 Guide to Towing", Trailer Life, 2012, 38 pages.
A. Gonzalez-Cantos, "Backing-Up Maneuvers of Autonomous Tractor-Trailer Vehicles using the Qualitative Theory of Nonlinear Dynamical Systems," International Journal of Robotics Research, Jan. 2009, vol. 28, 1 page.
L. Chu, Y. Fang, M. Shang, J. Guo, F. Zhou, "Estimation of Articulation Angle for Tractor Semi-Trailer Based on State Observer", ACM Digital Library, ICMTMA '10 Proceedings of the 2010 International Conference on Measuring Technology and Automation, vol. 2, Mar. 2010, 1 page.
M. Wagner, D. Zoebel, and A. Meroth, "Adaptive Software and Systems Architecture for Driver Assistance Systems" International Journal of Machine Learning and Computing, Oct. 2011, vol. 1, No. 4, 7 pages.
F.W. Kienhöfer; D. Cebon, "An Investigation of ABS Strategies for Articulated Vehicles", Cambridge University, Engineering Department, United Kingdom, date unknown, 13 pages.
C. Lundquist; W. Reinelt; O. Enqvist, "Back Driving Assistant for Passenger Cars with Trailer", ZF Lenksysteme GmbH, Schwabisch Gmünd, Germany, 2006 (SAE Int'l) Jan. 2006, 8 pages.
Zhe Leng; Minor, M., "A Simple Tractor-Trailer Backing Control Law for Path Following", IEEE, Intelligent Robots and Systems (IROS) IEEE/RSJ International Conference, Oct. 2010, 2 pages.
Kinjo, H.; Maeshiro, M.; Uezato, E.; Yamamoto, T., "Adaptive Genetic Algorithm Observer and its Application to Trailer Truck Control System", IEEE, SICE-ICASE International Joint Conference, Oct. 2006, 2 pgs.
J. Roh; H. Lee; W. Chung, "Control of a Car with a Trailer Using the Driver Assistance System", IEEE, International Conference on Robotics and Biomimetics; Phuket, Thailand, Dec. 2011, 6 pages.
A. Gonzalez-Cantos; J.I. Maza; A. Ollero, "Design of a Stable Backing Up Fuzzy Control of Autonomous Articulated Vehicles for Factory Automation", Dept. of Systems Engineering and Automatic Control, University of Seville, Spain, 2001, 5 pages.
Altafini, C.; Speranzon, A.; Wahlberg, B., "A Feedback Control Scheme for Reversing a Truck and Trailer Vehicle", IEEE, Robotics and Automation, IEEE Transactions, Dec. 2001, vol. 17, No. 6, 2 pages.
Zare, A. Sharafi; M. Kamyad, A.V., "A New Approach in Intelligent Trailer Parking", IEEE, 2010 2nd International Mechanical and Electrical Technology (ICMET), Sep. 2010, 1 page.
Tanaka, K.; Sano, M., "A Robust Stabilization Problem of Fuzzy Control Systems and its Application to Backing up Control of a Truck-trailer", IEEE Transactions on Fuzzy Systems, May 1994, vol. 2, No. 2, 1 page.
Sharafi, M. Zare; A. Kamyad; A.V. Nikpoor, S., "Intelligent Parking Method for Truck in Presence of Fixed and Moving Obstacles and Trailer in Presence of Fixed Obstacles: Advanced Fuzzy Logic Technologies in Industrial Applications", IEEE, 2010 International Electronics and Information Engineering (ICEIE), Aug. 2010, vol. 2, 1 page.
Hodo, D. W.; Hung, J.Y.; Bevly, D. M.; Millhouse, S., "Effects of Sensor Placement and Errors on Path Following Control of a Mobile Robot-Trailer System", IEEE, American Control Conference, Jul. 2007, 1 page.
Sharafi, M. Zare; A. Kamyad; A.V. Nikpoor, S., "Intelligent Parking Method for Trailers in Presence of Fixed and Moving Obstacles", IEEE, 2010 3rd International Conference on Advanced Computer Theory and Engineering (ICACTE), Aug. 2010, vol. 6, 1 page.
Chieh Chen; Tomizuka, M., "Steering and Independent Braking Control for Tractor-Semitrailer Vehicles in Automated Highway Systems", IEEE, Proceedings of the 34th IEEE Conference on Decision and Control, Dec. 1995, vol. 2, 1 page
P. Bolzern, R.M. Desantis, A. Locatelli, "An Input-Output Linearization Approach to the Control of an n-Body Articulated Vehicle", J. Dyn. Sys., Meas., Control, Sep. 2001, vol. 123, No. 3, 3 pages.
Dieter Zöbel, David Polock, Philipp Wojke, "Steering Assistance for Backing Up Articulated Vehicles", Systemics, Cybernetics and Informatics; vol. 1, No. 5, date unknown, 6 pages.
J.R. Billing; J.D. Patten; R.B. Madill, "Development of Configurations for Infrastructure-Friendly Five- and Six-Axle SemiTrailers", National Research Council of Canada and Ontario Ministry of Transportation, date unknown, 11 pages.
Jesus Morales, Anthony Mandow, Jorge L Martinez, and Alfonso Garcia-Cerezo, "Driver Assistance System for Backward Maneuvers in Passive Multi-Trailer Vehicles", IEEE/RSJ International Conference on Intelligent Robots and Systems (IROS), Oct. 2012, 7 pages.
Cedric Pradalier and Kane Usher, "Experiments in Autonomous Reversing of a Tractor-Trailer System", 6th International Conference on Field and Service Robotics, inria-00195700, Version 1, Dec. 2007, 10 pages.
Andri Riid, Alar Leibak, Ennu Rüstern, "Fuzzy Backing Control of Truck and Two Trailers", Tallinn University if Technology; Tallinn, Estonia, date unknown, 6 pages.
Jane McGrath, "How to Avoid Jackknifing", A Discovery Company, date unknown, 3 pages.
Claudio Altafini, Alberto Speranzon, and Karl Henrik Johansson, "Hybrid Control of a Truck and Trailer Vehicle", Springer-Verlag Berlin Heidelberg, HSCC 2002, LNCS 2289; 2002, 14 pages.
Jujnovich, B.; Roebuck, R.; Odhams, A.; David, C., "Implementation of Active Rear Steering of a Tractor Semitrailer", Cambridge University, Engineering Department; Cambridge, United Kingdom, date unknown, 10 pages.
A.M.C. Odhams; R.L. Roebuck; C. Cebon, "Implementation of Active Steering on a Multiple Trailer Long Combination Vehicle", Cambridge University, Engineering Department; Cambridge, United Kingdom, date unknown, 13 pages.
Cedric Pradalier and Kane Usher, "Robust Trajectory Tracking for a Reversing Tractor-Trailer System", (Draft), Field and Service Robotics Conference, CSIRO ICT Centre, Jul. 2007, 16 pages.
Stahn, R.; Heiserich, G.; Stopp, A., "Laser Scanner-Based Navigation for Commercial Vehicles", IEEE, 2007 IEEE Intelligent Vehicles Symposium, Jun. 2007, 1 page.
Lee Yong H.; Weiwen Deng; Chin Yuen-Kwok Steve; McKay Neil, "Feasibility Study for a Vehicle-Trailer Backing Up Control", Refdoc.fr, SAE Transactions, vol. 113, No. 6, 2004, 1 page.
A.M.C. Odhams; R.L. Roebuck; B.A. Jujnovich; D. Cebon, "Active Steering of a Tractor-Semi-Trailer" Proceedings of the Institution of Mechanical Engineers, Part D: Journal of Automobile Engineering, SAGE Journals, vol. 225, No. 7, Jul. 2011, 1 page.
Haviland, G S, "Automatic Brake Control for Trucks—What Good Is It?", TRID, Society of Automotive Engineers, Sep. 1968, 1 page.
William E. Travis; David W. Hodo; David M. Bevly; John Y. Hung, "UGV Trailer Position Estimation Using a Dynamic Base RTK System", American Institute of Aeronautics and Astronautics, date unknown, 12 pages.
"VSE Electronic Trailer Steering", ETS for Trailers, version 2009, VSE Trailer Systems B.V., 2009, 28 pages.
"Telematics Past, Present, and Future," Automotive Service Association, www.ASAshop.org, May 2008, 20 pages.
"Fully Automatic Trailer Tow Hitch With LIN Bus," https://webista.bmw.com/webista/show?id=1860575499&lang=engb&print=1, date unknown, 5 pages.
"VBOX Yaw Rate Sensor With Integral Accelerometers," Racelogic, www.racelogic.co.uk, date unknown, 2 pages.
P.D.C.R Jayarathna; J.V Wijayakulasooriya; S.R Kodituwakku, "Fuzzy Logic and Neural Network Control Systems for Backing up a Truck and a Trailer", International Journal of Latest Trends in Computing, vol. 2, No. 3, Sep. 2011, 8 pages.
Olof Enqvist, "AFS-Assisted Trailer Reversing," Institutionen för systemteknik Deartment of Electrical Engineering, Jan. 27, 2006, 57 pages.
Tofel, Kevin C., "How to measure anything with a camera and software", Feb. 6, 2007, 6 pgs. [Retrieved from http://giaom.com/2007/06/how_to_measure/ on Sep. 4, 2014].
Sonnenberg, Jan, "Service and User Interface Transfer from Nomadic Devices to Car Infotainment Systems", Second Interna-

(56) References Cited

OTHER PUBLICATIONS tional Conference on Automotive User Interfaces and Interactive Vehicular Applications (Automotive UI), Nov. 11-12, 2010, pp. 162-165.

Ratajczak, Robert; Grajek, Tomasz; Wegner, Krzysztof; Klimaszewski, Krzusztof; Kurc, Maciej; Domański, Marek, "Vehicle Dimensions Estimation Scheme Using AAM on Sterescopic Video", date unknown, pp. 4321-4325.

"Measure and Calculate Distance", Help Forum, Google Maps, 1 pg. [Retrieved from https://support.google.com/maps/answer/1628031?hl=en on Sep. 4, 2014].

De Brito, Jr., Jailson A.; De Campos, Luis Edmundo Prado; "Automatic Vehicle Classification Using Learning-based Computer Vision and Fuzzy Logic", Departmento de Ciencia da Computacao, Instituto de Matematics, Universidade Federal da Bahia, date unknown, 4 pgs.

Olagnekov, Louka; Belongie, Serge, "Recognizing Cars", Department of Computer Science and Engineering, University of California, San Diego, CA, date unknown, pp. 1-8.

\* cited by examiner

TRAILER LENGTH AND HITCH ANGLE BIAS ESTIMATION

FIELD OF THE INVENTION

The disclosure made herein relates generally to trailer motion and parameter estimation, and more particularly to a length estimation for a trailer using yaw signals in a system to assist with vehicle guidance of the trailer, such as a trailer backup assist system.

BACKGROUND OF THE INVENTION

Reversing a vehicle while towing a trailer can be challenging for many drivers, particularly for drivers that drive with a trailer on an infrequent basis or with various types of trailers. Systems used to assist a driver with backing a trailer frequently estimate the position of the trailer relative to the vehicle with a sensor or the like that determines a steering input for the vehicle based on an input trailer curvature path and determined a hitch angle. Both the hitch angle determination and the steering input determination require use of a kinematic model of the combined trailer and vehicle that includes the length of the trailer, more particularly, from the point of attachment with the vehicle to center of the axles thereof. While some systems have relied on user input for the trailer length, doing so may place an undesired burden on the user and may introduce inaccuracies that some such systems are unequipped to handle. The accuracy and reliability of the calculations involving trailer length can be critical to the operation of the backup assist system. Accordingly, improvements related to automated system estimation of trailer length in an accurate manner may be desired.

SUMMARY OF THE INVENTION

According to one aspect of the present invention, a backup assist system for a vehicle and trailer combination includes a steering system and a first sensor detecting a first dynamic condition of the combination. The system further includes a controller receiving a value for the first dynamic condition from the first sensor at a plurality of instances. The controller further solves for a corresponding plurality of parameters in a kinematic model of the combination and controls the steering system using the plurality of parameters in the kinematic model.

According to another aspect of the present invention, a vehicle includes a steering system, a first sensor detecting a first dynamic condition of at least one of the vehicle or the vehicle in a combination with a trailer, and a trailer backup assist system. The trailer backup assist system includes a controller receiving a value for the first dynamic condition from the first sensor at a plurality of instances, solving for a corresponding plurality of parameters in a kinematic model of the combination, and controlling the steering system using the plurality of parameters in the kinematic model.

According to another aspect of the present invention, a method for assisting a vehicle in reversing a trailer includes determining unknown values for a plurality of parameters in a combination of the vehicle and the trailer, which includes receiving a measurement for a first dynamic condition of the combination at a plurality of instances and solving for the parameters in a kinematic model of the combination. The method further includes implementing a reversing operation including controlling a vehicle steering system using the plurality of parameters.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
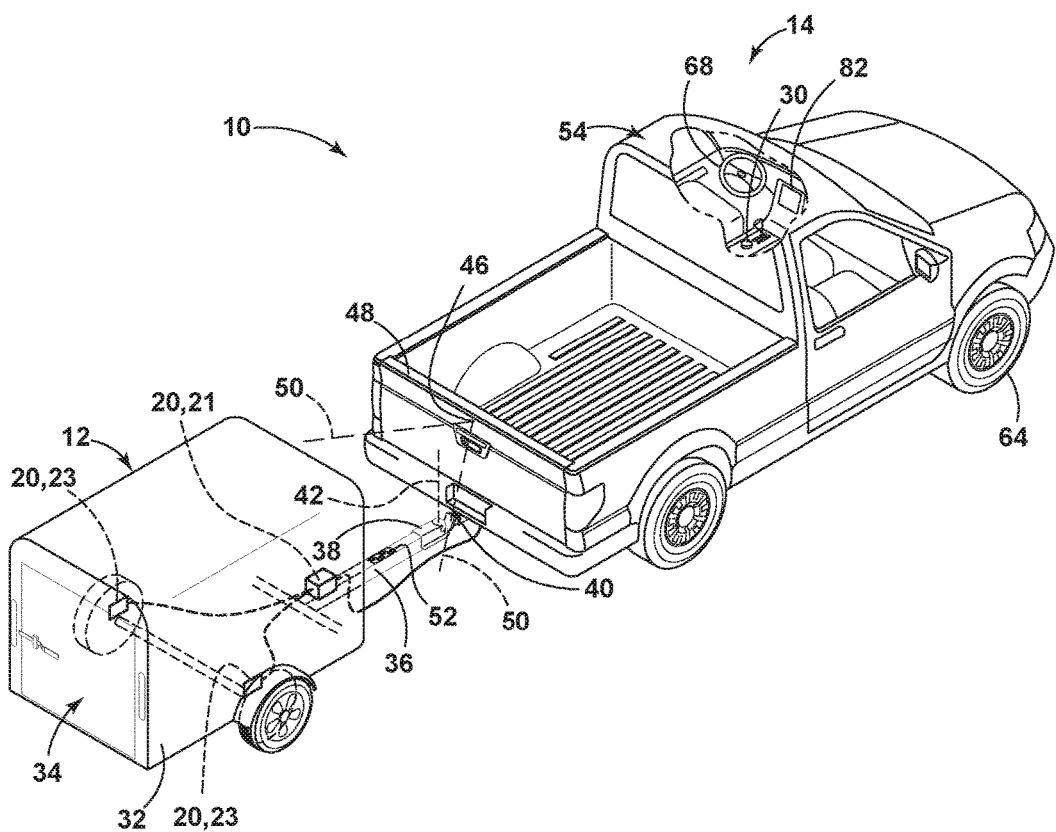
FIG. 1 is a top perspective view of a vehicle attached to a trailer with one embodiment of a hitch angle sensor for operating a trailer backup assist system.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Figure 2:
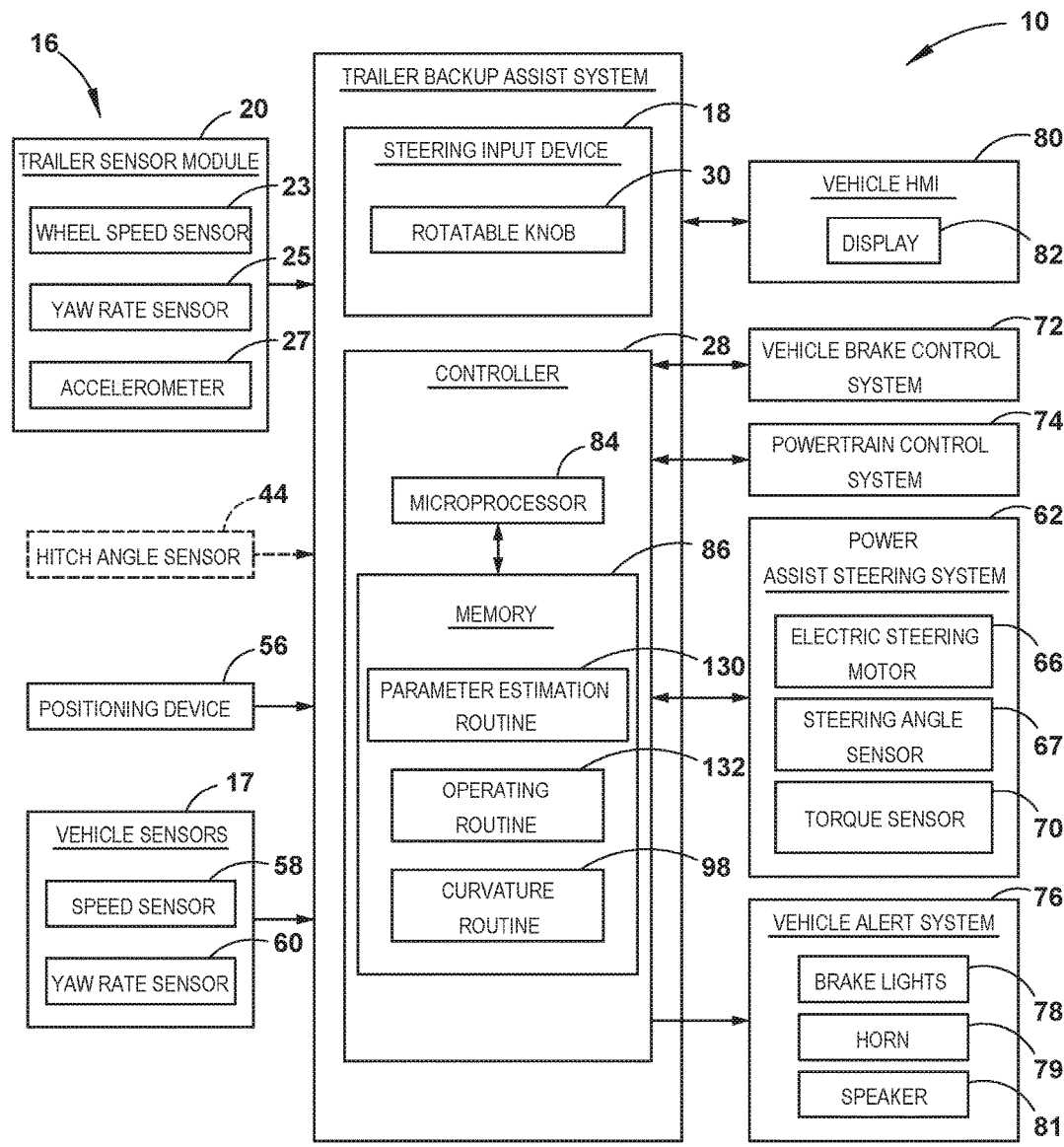
FIG. 2 is a block diagram illustrating one embodiment of the trailer backup assist system having a steering input device, a curvature controller, and a trailer braking system.
Figure 3:
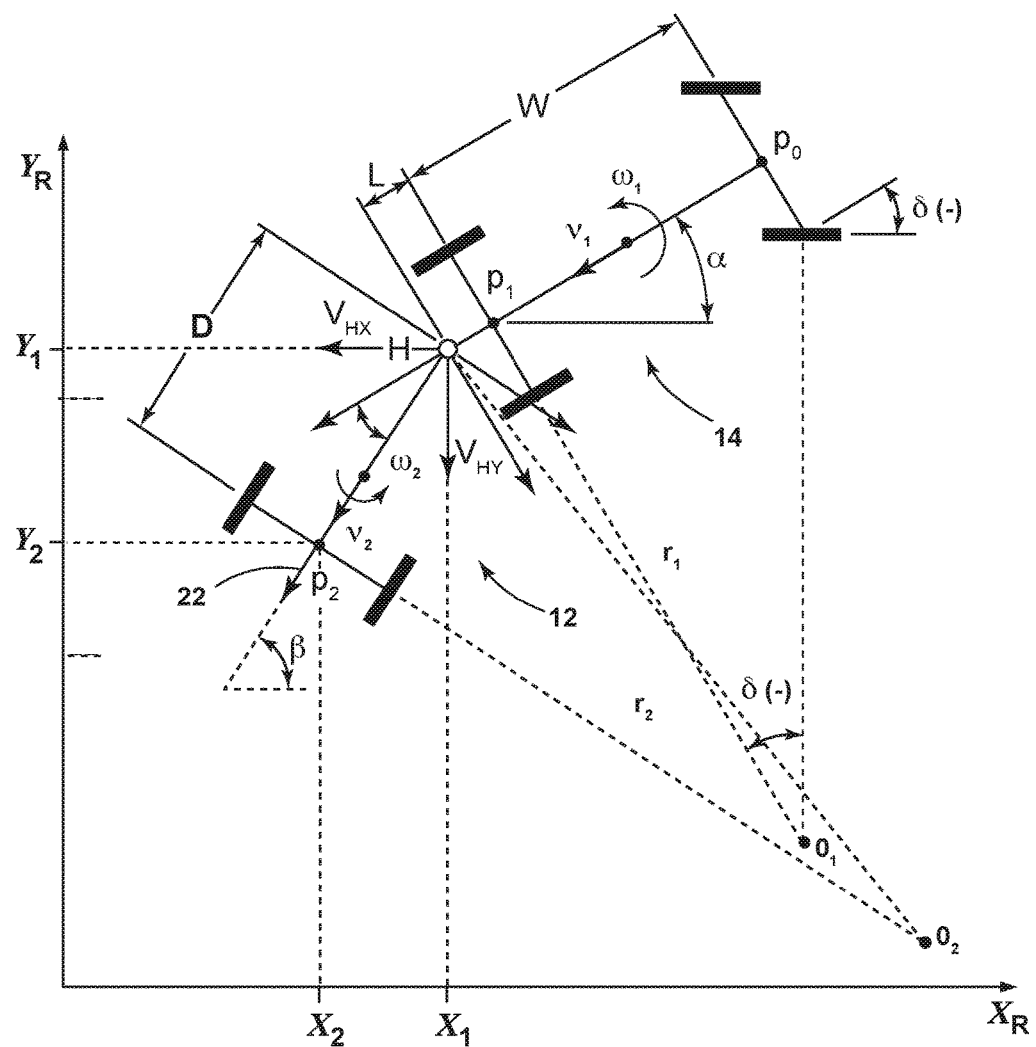
FIG. 3 is a schematic diagram that illustrates the geometry of a vehicle and a trailer overlaid with a two-dimensional x-y coordinate system, identifying variables used to determine a kinematic relationship of the vehicle and the trailer for the trailer backup assist system, according to one embodiment.

Referring to FIGS. 1-3, reference numeral 10 generally designates a trailer backup assist system for controlling a backing path of a trailer 12 attached to a vehicle 14 by allowing a driver of the vehicle 14 to specify a desired curvature 26 of the backing path of the trailer 12. In one embodiment, the trailer backup assist system 10 automatically steers the vehicle 14 to guide the trailer 12 on the desired curvature or backing path 26 as a driver uses the accelerator and brake pedals to control the reversing speed of the vehicle 14. To monitor the position of the trailer 12 relative to the vehicle 14, the trailer backup assist system 10 may include a sensor system 16 that senses or otherwise determines a hitch angle $\gamma$ between the trailer 12 and the vehicle 14. In one embodiment, the sensor system 16 may include a hitch angle sensor 44. In some implementations, the hitch angle sensor 44 may exhibit a bias in the reading that results in the measured hitch angle $\gamma_m$ being offset from the actual hitch angle $\gamma$ by an offset angle $\gamma_o$. Additionally, as explained further below, backup assist system 10 may require various other parameters relating to the geometry of the combined trailer 12 and vehicle 14 to implement a routine that controls the backing of trailer 12. In an embodiment, backup assist system 10 includes a steering system 62 and a first sensor detecting a first dynamic condition of the combination. The system 10 further includes a controller 28 receiving a value for the first dynamic condition from the first sensor at a plurality of instances. The controller 28 further solves for a corresponding plurality of parameters in a kinematic model of the combination and controls the steering system 62 using the plurality of parameters in the kinematic model.

With respect to the general operation of the trailer backup assist system 10, a steering input device 18 may be provided, such as a rotatable knob 30, for a driver to provide the desired curvature 26 of the trailer 12. As such, the steering input device 18 may be operable between a plurality of selections, such as successive rotated positions of a knob 30, that each provide an incremental change to the desired curvature 26 of the trailer 12. Upon inputting the desired curvature 26, the controller may generate a steering command for the vehicle 14 to guide the trailer 12 on the desired curvature 26 based on the estimated hitch angle $\gamma$ and a kinematic relationship between the trailer 12 and the vehicle 14. In other embodiments, the hitch angle $\gamma$ may be controlled using knob 30 such that the system 10 derives a steering command to achieve and maintain such a hitch angle $\gamma$. Therefore, the accuracy of the hitch angle estimation, and accordingly, the trailer length estimation is significant in operating the trailer backup assist system 10.

With reference to the embodiment shown in FIG. 1, the vehicle 14 is a pickup truck embodiment that is equipped with one embodiment of the trailer backup assist system 10 for controlling the backing path of the trailer 12 that is attached to the vehicle 14. Specifically, the vehicle 14 is pivotally attached to one embodiment of the trailer 12 that has a box frame 32 with an enclosed cargo area 34, a single axle having a right wheel assembly and a left wheel assembly, and a tongue 36 longitudinally extending forward from the enclosed cargo area 34. The illustrated trailer 12 also has a trailer hitch connector in the form of a coupler assembly 38 that is connected to a vehicle hitch connector in the form of a hitch ball 40. The coupler assembly 38 latches onto the hitch ball 40 to provide a pivoting ball joint connection 42 that allows for articulation of the hitch angle $\gamma$. It should be appreciated that additional embodiments of the trailer 12 may alternatively couple with the vehicle 14 to provide a pivoting connection, such as by connecting with a fifth wheel connector. It is also contemplated that additional embodiments of the trailer may include more than one axle and may have various shapes and sizes configured for different loads and items, such as a boat trailer or a flatbed trailer.

Still referring to FIG. 1, the sensor system 16 in the illustrated embodiment includes a sensor module 20 that may include a housed sensor cluster 21 mounted on the tongue 36 of the trailer 12 proximate the enclosed cargo area 34 and includes left and right wheel speed sensors 23 on laterally opposing wheels of the trailer 12. It is conceivable that the wheel speed sensors 23 may be bi-directional wheel speed sensors for monitoring both forward and reverse speeds. Also, it is contemplated that the sensor cluster 21 in additional embodiments may be mounted on alternative portions of the trailer 12. The sensor module 20 generates a plurality of signals indicative of various dynamics of the trailer 12. The signals may include a yaw rate signal, a lateral acceleration signal, and wheel speed signals generated respectively by a yaw rate sensor 25, an accelerometer 27, and the wheel speed sensors 23.

In the illustrated embodiment, the yaw rate sensor 25 and the accelerometer 27 are contained within the housed sensor cluster 21, although other configurations are conceivable. It is conceivable that the accelerometer 27, in some embodiments, may be two or more separate sensors and may be arranged at an offset angle, such as two sensors arranged at plus and minus forty-five degrees from the longitudinal direction of the trailer or arranged parallel with the longitudinal and lateral directions of the trailer, to generate a more robust acceleration signal. It is also contemplated that these sensor signals could be compensated and filtered to remove offsets or drifts, and smooth out noise. Further, the controller 28 may utilizes processed signals received outside of the sensor system 16, including standard signals from the brake control system 72 and the power assist steering system 62, such as vehicle yaw rate $\omega_1$, vehicle speed $v_1$, and steering angle $\delta$, to estimate, by various calculations, unknown parameters that fit within a kinematic model of the vehicle-trailer combination, as illustrated in FIG. 3. Such parameters may include the trailer hitch angle $\gamma$, trailer speed and related trailer parameters, such as the trailer length D, or the trailer hitch length L. As described in more detail below, the controller 28 may estimate the hitch angle $\gamma$, or may estimate an offset between a measured hitch angle $\gamma_m$ (such as by a hitch angle sensor) and an actual hitch angle $\gamma$ based on various other known parameters in view of the kinematic model of the relationship between the trailer 12 and the vehicle 14. The controller 28 of the trailer backup assist system 10 may also utilize the estimated variables and parameters to control the steering system 62, brake control system 72, and the powertrain control system 74, such as to assist backing the vehicle-trailer combination or to mitigate a trailer sway condition according to further calculations based on the kinematic model.

The sensor system 16 may also a vision-based hitch angle sensor 44 for measuring the hitch angle γ between the vehicle 14 and the trailer 12. In an embodiment wherein the hitch angle γ is determined using other measured parameters in view of the kinematic relationship between the trailer 12 and the vehicle 14, the vision-based hitch angle sensor 44 may be used as a backup system or as an additional check on the value obtained using the kinematic model. In other embodiments, the trailer angle γ may not be estimated or calculated directly using the kinematic model, the system 10 instead calculating an offset $γ_o$ between a measured hitch angle $γ_m$ and the actual hitch angle γ such that the offset $γ_o$ can be added to subsequent measured hitch angles $γ_m$ to compensate for such an offset in continuing to use the vision-based hitch angle sensor 44 to obtain values for the hitch angle γ. In another embodiment, the vision-based hitch angle sensor 44 may be omitted entirely with an estimate of hitch angle γ being calculated using known or measured parameters in the kinematic model.

When present, the illustrated hitch angle sensor 44 employs a camera 46 (e.g. video imaging camera) that may be located proximate an upper region of the vehicle tailgate 48 at the rear of the vehicle 14, as shown, such that the camera 46 may be elevated relative to the tongue 36 of the trailer 12. The illustrated camera 46 has an imaging field of view 50 located and oriented to capture one or more images of the trailer 12, including a region containing one or more desired target placement zones for at least one target 52 to be secured. Although it is contemplated that the camera 46 may capture images of the trailer 12 without a target 52 to determine the hitch angle γ, in the illustrated embodiment, the trailer backup assist system 10 includes a target 52 placed on the trailer 12 to allow the trailer backup assist system 10 to utilize information acquired via image acquisition and processing of the target 52. For instance, the illustrated camera 46 may include a video imaging camera that repeatedly captures successive images of the trailer 12 that may be processed to identify the target 52 and its location on the trailer 12 for determining movement of the target 52 and the trailer 12 relative to the vehicle 14 and the corresponding hitch angle γ. It should also be appreciated that the camera 46 may include one or more video imaging cameras and may be located at other locations on the vehicle 14 to acquire images of the trailer 12 and the desired target placement zone, such as on a passenger cab 54 of the vehicle 14 to capture images of a gooseneck trailer. Furthermore, it is contemplated that additional embodiments of the hitch angle sensor 44 and the sensor system 16 for providing the hitch angle γ may include one or a combination of a potentiometer, a magnetic-based sensor, an optical sensor, a proximity sensor, a rotational sensor, a capacitive sensor, an inductive sensor, or a mechanical based sensor, such as a mechanical sensor assembly mounted to the pivoting ball joint connection 42, energy transducers of a reverse aid system, a blind spot system, and/or a cross traffic alert system, and other conceivable sensors or indicators of the hitch angle γ to supplement or be used in place of the vision-based hitch angle sensor 44.

With reference to the embodiment of the trailer backup assist system 10 shown in FIG. 2, the hitch angle sensor 44 is provided in dashed lines to illustrate that in some embodiments it may be omitted, such as when the trailer sensor module 20 is provided and used to estimate hitch angle γ. The illustrated embodiment of the trailer backup assist system 10 receives vehicle and trailer status-related information from additional sensors and devices. This information includes positioning information from a positioning device 56, which may include a global positioning system (GPS) on the vehicle 14 or a handled device, to determine a coordinate location of the vehicle 14 and the trailer 12 based on the location of the positioning device 56 with respect to the trailer 12 and/or the vehicle 14 and based on the estimated hitch angle γ. The positioning device 56 may additionally or alternatively include a dead reckoning system for determining the coordinate location of the vehicle 14 and the trailer 12 within a localized coordinate system based at least on vehicle speed, steering angle, and hitch angle γ. Other vehicle information received by the trailer backup assist system 10 may include a speed of the vehicle 14 from a speed sensor 58 and a yaw rate of the vehicle 14 from a yaw rate sensor 60. It is contemplated that in additional embodiments, the hitch angle sensor 44 and other vehicle sensors and devices may provide sensor signals or other information, such as proximity sensor signals or successive images of the trailer 12, that the controller of the trailer backup assist system 10 may process with various routines to determine an indicator of the hitch angle γ, such as a range of hitch angles.

As further shown in FIG. 2, one embodiment of the trailer backup assist system 10 is in communication with a power assist steering system 62 of the vehicle 14 to operate the steered wheels 64 (FIG. 1) of the vehicle 14 for moving the vehicle 14 in such a manner that the trailer 12 reacts in accordance with the desired curvature 26 of the trailer 12. In the illustrated embodiment, the power assist steering system 62 is an electric power-assisted steering (EPAS) system that includes an electric steering motor 66 for turning the steered wheels 64 to a steering angle based on a steering command, whereby the steering angle may be sensed by a steering angle sensor 67 of the power assist steering system 62. The steering command may be provided by the trailer backup assist system 10 for autonomously steering during a backup maneuver and may alternatively be provided manually via a rotational position (e.g., steering wheel angle) of a steering wheel 68 (FIG. 1). However, in the illustrated embodiment, the steering wheel 68 of the vehicle 14 is mechanically coupled with the steered wheels 64 of the vehicle 14, such that the steering wheel 68 moves in concert with steered wheels 64, preventing manual intervention with the steering wheel 68 during autonomous steering. More specifically, a torque sensor 70 is provided on the power assist steering system 62 that senses torque on the steering wheel 68 that is not expected from autonomous control of the steering wheel 68 and therefore indicative of manual intervention, whereby the trailer backup assist system 10 may alert the driver to discontinue manual intervention with the steering wheel 68 and/or discontinue autonomous steering.

In alternative embodiments, some vehicles have a power assist steering system 62 that allows a steering wheel 68 to be partially decoupled from movement of the steered wheels 64 of such a vehicle. Accordingly, the steering wheel 68 can be rotated independent of the manner in which the power assist steering system 62 of the vehicle controls the steered wheels 64 (e.g., autonomous steering as commanded by the trailer backup assist system 10). As such, in these types of vehicles where the steering wheel 68 can be selectively decoupled from the steered wheels 64 to allow independent operation thereof, the steering wheel 68 may be used as a steering input device 18 for the trailer backup assist system 10, as disclosed in greater detail herein.

Referring again to the embodiment illustrated in FIG. 2, the power assist steering system 62 provides the controller 28 of the trailer backup assist system 10 with information relating to a rotational position of steered wheels 64 of the vehicle 14, including a steering angle. The controller 28 in the illustrated embodiment processes the current steering angle δ, in addition to other vehicle 14 and trailer 12 conditions to guide the trailer 12 along the desired curvature 26. It is conceivable that the trailer backup assist system 10, in additional embodiments, may be an integrated component of the power assist steering system 62. For example, the power assist steering system 62 may include a trailer backup assist algorithm for generating vehicle steering information and commands as a function of all or a portion of information received from the steering input device 18, the hitch angle sensor 44, the power assist steering system 62, a vehicle brake control system 72, a powertrain control system 74, and other vehicle sensors and devices.

As also illustrated in FIG. 2, the vehicle brake control system 72 may also communicate with the controller 28 to provide the trailer backup assist system 10 with braking information, such as vehicle wheel speed, and to receive braking commands from the controller 28. For instance, vehicle speed information can be determined from individual wheel speeds as monitored by the brake control system 72. Vehicle speed may also be determined from the powertrain control system 74, the speed sensor 58, and the positioning device 56, among other conceivable means. In some embodiments, individual wheel speeds can also be used to determine a vehicle yaw rate, which can be provided to the trailer backup assist system 10 in the alternative or in addition to the vehicle yaw rate sensor 60. In certain embodiments, the trailer backup assist system 10 can provide vehicle braking information to the brake control system 72 for allowing the trailer backup assist system 10 to control braking of the vehicle 14 during backing of the trailer 12. For example, the trailer backup assist system 10 in some embodiments may regulate speed of the vehicle 14 during backing of the trailer 12, which can reduce the potential for unacceptable trailer backup conditions. Examples of unacceptable trailer backup conditions include, but are not limited to, a vehicle 14 over speed condition, a high hitch angle rate, trailer angle dynamic instability, a calculated theoretical trailer jackknife condition (defined by a maximum vehicle steering angle, drawbar length, tow vehicle wheelbase, and an effective trailer length), or physical contact jackknife limitation (defined by an angular displacement limit relative to the vehicle 14 and the trailer 12), and the like. It is disclosed herein that the trailer backup assist system 10 can issue an alert signal corresponding to a notification of an actual, impending, and/or anticipated unacceptable trailer backup condition.

The powertrain control system 74, as shown in the embodiment illustrated in FIG. 2, may also interact with the trailer backup assist system 10 for regulating speed and acceleration of the vehicle 14 during backing of the trailer 12. As mentioned above, regulation of the speed of the vehicle 14 may be necessary to limit the potential for unacceptable trailer backup conditions such as, for example, jackknifing and trailer angle dynamic instability. Similar to high-speed considerations as they relate to unacceptable trailer backup conditions, high acceleration and high dynamic driver curvature requests can also lead to such unacceptable trailer backup conditions.

With continued reference to FIG. 2, the trailer backup assist system 10 in the illustrated embodiment may communicate with one or more devices, including a vehicle alert system 76, which may prompt visual, auditory, and tactile warnings. For instance, vehicle brake lights 78 and vehicle emergency flashers may provide a visual alert and a vehicle horn 79 and/or speaker 81 may provide an audible alert. Additionally, the trailer backup assist system 10 and/or vehicle alert system 76 may communicate with a human machine interface (HMI) 80 for the vehicle 14. The HMI 80 may include a vehicle display 82, such as a center-stack mounted navigation or entertainment display (FIG. 1). Further, the trailer backup assist system 10 may communicate via wireless communication with another embodiment of the HMI 80, such as with one or more handheld or portable devices, including one or more smartphones. The portable device may also include the display 82 for displaying one or more images and other information to a user. For instance, the portable device may display one or more images of the trailer 12 and an indication of the estimated hitch angle on the display 82. In addition, the portable device may provide feedback information, such as visual, audible, and tactile alerts.

As further illustrated in FIG. 2, the trailer backup assist system 10 includes a steering input device 18 that is connected to the controller 28 for allowing communication of information therebetween. It is disclosed herein that the steering input device 18 can be coupled to the controller 28 in a wired or wireless manner. The steering input device 18 provides the trailer backup assist system 10 with information defining the desired backing path of travel of the trailer 12 for the controller 28 to process and generate steering commands. More specifically, the steering input device 18 may provide a selection or positional information that correlates with a desired curvature 26 of the desired backing path of travel of the trailer 12. Also, the trailer steering commands provided by the steering input device 18 can include information relating to a commanded change in the path of travel, such as an incremental change in the desired curvature 26, and information relating to an indication that the trailer 12 is to travel along a path defined by a longitudinal centerline axis of the trailer 12, such as a desired curvature value of zero that defines a substantially straight path of travel for the trailer. As will be discussed below in more detail, the steering input device 18 according to one embodiment may include a movable control input device for allowing a driver of the vehicle 14 to command desired trailer steering actions or otherwise select and alter a desired curvature. For instance, the moveable control input device may be a rotatable knob 30 (see FIGS. 14 and 15), which can be rotatable about a rotational axis extending through a top surface or face of the knob 30. In other embodiments, the rotatable knob 30 may be rotatable about a rotational axis extending substantially parallel to a top surface or face of the rotatable knob 30. Furthermore, the steering input device 18, according to additional embodiments, may include alternative devices for providing a desired curvature 26 or other information defining a desired backing path, such as a joystick, a keypad, a series of depressible buttons or switches, a sliding input device, various user interfaces on a touch-screen display, a vision based system for receiving gestures, a control interface on a portable device, and other conceivable input devices as generally understood by one having ordinary skill in the art. It is contemplated that the steering input device 18 may also function as an input device for other features, such as providing inputs for other vehicle features or systems.

Still referring to the embodiment shown in FIG. 2, the controller 28 is configured with a microprocessor 84 to process logic and routines stored in memory 86 that receive information from the sensor system 16, including the trailer sensor module 20, the hitch angle sensor 44, the steering input device 18, the power assist steering system 62, the vehicle brake control system 72, the trailer braking system, the powertrain control system 74, and other vehicle sensors and devices. The controller 28 may generate vehicle steering information and commands as a function of all or a portion of the information received. Thereafter, the vehicle steering information and commands may be provided to the power assist steering system 62 for affecting steering of the vehicle 14 to achieve a commanded path of travel for the trailer 12. The controller 28 may include the microprocessor 84 and/or other analog and/or digital circuitry for processing one or more routines. Also, the controller 28 may include the memory 86 for storing one or more routines, including a hitch angle estimation routine 130, an operating routine 132, and a curvature routine 98. It should be appreciated that the controller 28 may be a stand-alone dedicated controller or may be a shared controller integrated with other control functions, such as integrated with the sensor system 16, the power assist steering system 62, and other conceivable onboard or off-board vehicle control systems.

With reference to FIG. 3, we now turn to a discussion of vehicle and trailer information and parameters used to calculate a kinematic relationship between a curvature of a path of travel of the trailer 12 and the steering angle of the vehicle 14 towing the trailer 12, which can be desirable for a trailer backup assist system 10 configured in accordance with some embodiments, including for use by a curvature routine 98 of the controller 28 in one embodiment. To achieve such a kinematic relationship, certain assumptions may be made with regard to parameters associated with the vehicle/trailer system. Examples of such assumptions include, but are not limited to, the trailer 12 being backed by the vehicle 14 at a relatively low speed, wheels of the vehicle 14 and the trailer 12 having negligible (e.g., no) slip, tires of the vehicle 14 having negligible (e.g., no) lateral compliance, tires of the vehicle 14 and the trailer 12 having negligible (e.g., no) deformation, actuator dynamics of the vehicle 14 being negligible, and the vehicle 14 and the trailer 12 exhibiting negligible (e.g., no) roll or pitch motions, among other conceivable factors with the potential to have an effect on controlling the trailer 12 with the vehicle 14.

As shown in FIG. 3, for a system defined by a vehicle 14 and a trailer 12, the kinematic relationship is based on various parameters associated with the vehicle 14 and the trailer 12. These parameters include:

$\delta$: steering angle at steered front wheels of the vehicle;
$\alpha$: yaw angle of the vehicle;
$\beta$: yaw angle of the trailer;
$\gamma$: hitch angle ($\gamma=\beta-\alpha$);
W: wheel base of the vehicle;
L: drawbar length between hitch point and rear axle of the vehicle;
D: distance (trailer length) between hitch point and axle of the trailer or effective axle for a multiple axle trailer; and
$r_2$: curvature radius for the trailer.

One embodiment of a kinematic relationship between trailer path radius of curvature $r_2$ at the midpoint of an axle of the trailer 12, steering angle $\delta$ of the steered wheels 64 of the vehicle 14, and the hitch angle $\gamma$ can be expressed in the equation provided below. As such, if the hitch angle $\gamma$ is provided, the trailer path curvature $\kappa_2$ can be controlled based on regulating the steering angle $\delta$ (where $\dot{\beta}$ is trailer yaw rate and $\dot{\eta}$ is trailer velocity).

$$\kappa_2 = \frac{1}{r_2} = \frac{\dot{\beta}}{\dot{\eta}} = \frac{\left(W + \frac{KV^2}{g}\right)\sin\gamma + L\cos\gamma\tan\delta}{\left(\left(W + \frac{KV^2}{g}\right)\cos\gamma - L\sin\gamma\tan\delta\right)}$$

This relationship can be expressed to provide the steering angle $\delta$ as a function of trailer path curvature $\kappa_2$ and hitch angle $\gamma$.

$$\delta = \tan^{-1}\left(\frac{\left(W + \frac{KV^2}{g}\right)[\kappa_2 D\cos\gamma - \sin\gamma]}{DL\kappa_2\sin\gamma + L\cos\gamma}\right) = F(\gamma, \kappa_2, K)$$

Accordingly, for a particular vehicle and trailer combination, certain parameters (e.g., D, W and L) of the kinematic relationship are constant and assumed known when completing a backup operating involving outputting steering angle $\delta$. V is the vehicle longitudinal speed and g is the acceleration due to gravity. K is a speed dependent parameter which when set to zero makes the calculation of steering angle independent of vehicle speed. For example, vehicle-specific parameters of the kinematic relationship can be predefined in an electronic control system of the vehicle 14 and trailer-specific parameters of the kinematic relationship can be inputted by a driver of the vehicle 14, determined from sensed trailer behavior in response to vehicle steering commands, or otherwise determined from signals provided by the trailer 12. Trailer path curvature $\kappa_2$ can be determined from the driver input via the steering input device 18. Through the use of the equation for providing steering angle, a corresponding steering command can be generated by the curvature routine 98 for controlling the power assist steering system 62 of the vehicle 14.

In an additional embodiment, an assumption may be made by the curvature routine 98 that a longitudinal distance L between the pivoting connection and the rear axle of the vehicle 14 is equal to zero for purposes of operating the trailer backup assist system 10 when a gooseneck trailer or other similar trailer is connected with the a hitch ball or a fifth wheel connector located over a rear axle of the vehicle 14. The assumption essentially assumes that the pivoting connection with the trailer 12 is substantially vertically aligned with the rear axle of the vehicle 14. When such an assumption is made, the controller 28 may generate the steering angle command for the vehicle 14 as a function independent of the longitudinal distance L between the pivoting connection and the rear axle of the vehicle 14. It is appreciated that the gooseneck trailer mentioned generally refers to the tongue configuration being elevated to attach with the vehicle 14 at an elevated location over the rear axle, such as within a bed of a truck, whereby embodiments of the gooseneck trailer may include flatbed cargo areas, enclosed cargo areas, campers, cattle trailers, horse trailers, lowboy trailers, and other conceivable trailers with such a tongue configuration.

As can be appreciated based on the foregoing, there are various ones of the kinematic parameters in the curvature $\kappa_2$ and steering input $\delta$ equations that are generally fixed and correspond to the dimensions of the vehicle 14 and trailer 12 combination. Specifically, the length D of the trailer 12, the wheel base W of the vehicle 14, and the distance L from the hitch connection H to the rear axle of the vehicle 14 are generally fixed and may be stored in the memory 86 of system 10 (FIG. 2), whereas other kinematic parameters may be dynamic and obtained from trailer sensor module 20 and vehicle sensors 17 on an ongoing basis. It is noted that the wheel base of the vehicle 14 and the distance from the hitch connection to the rear axle of the vehicle 14 relate only to vehicle 14 itself, within which the controller 28 and, accordingly, memory 86 are installed. It follows, then, these parameters may be stored in memory 86 during manufacture of vehicle 14, or during installation of the relevant portions of system 10 therein, as they are known in relation to the specific make and model of the particular vehicle 14. On the other hand, the length D of the trailer 12, while fixed with respect to a particular initiated operating routine 132, may vary as different trailers 12 are hitched to vehicle 14 for towing thereby. Further, the particular trailer 12 with which a given vehicle 14 will be used may not be known during manufacture of vehicle 14 or installation of system 10, and a user of such a vehicle 14 may wish to use vehicle 14 in various operating routines 132 with various trailers 12 of different sizes and configurations. Accordingly, a routine for system 10 obtaining the particular trailer length D of a trailer hitched with vehicle 14 may be needed and may be required prior to system 10 implementing operating routine 132. In further aspects, various trailer hitch assemblies may be used with vehicle 14 such that the particular value for L may also vary. Accordingly, the estimation routine 130 for system 10 obtaining the trailer length D may also obtain drawbar length L prior to operation of curvature routine 98.

Figure 4:
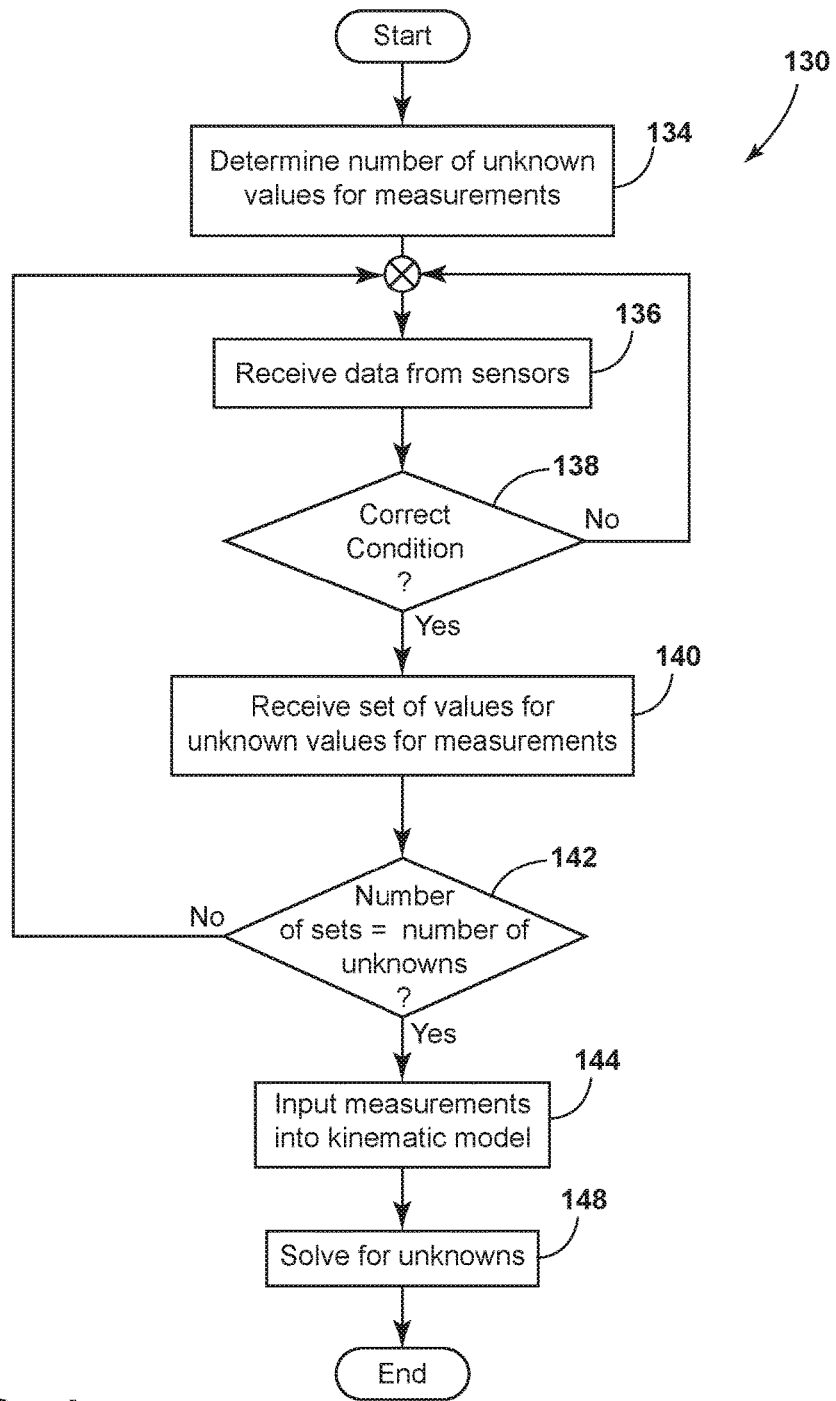
FIG. 4 is a flowchart depicting a process for determining one or more unknown variables of the kinematic relationship that can be implemented by the trailer backup assist system.

Turning now to FIG. 4, in various embodiments, controller 28 can determine one or more unknown values or parameters of the kinematic model using a series of inputs regarding known or measurable values. In various examples described herein, this can be done by taking inputs regarding measurable dynamic parameters of the kinematic model at a number of intervals that correspond to the number of unknown values such that various equations derived from the kinematic model can be solved for the unknown values. As shown in FIG. 4, the general form of such estimation routine 130 can include first determining the number of unknown parameters, which may include the trailer length D, the drawbar length L, and the hitch angle γ or the hitch angle offset $\gamma_o$, for example, in step 134. Controller 28 then, in step 136 receives various data from certain ones of the vehicle sensors (e.g., vehicle speed sensor 58, vehicle yaw rate sensor 60, and trailer yaw rate sensor 25) as needed to identify a desired condition for calculating the unknown values in step 138. As discussed further below, certain specific calculations are carried out using data obtained during steady-state (i.e. constant hitch angle and vehicle speed) movement of vehicle 14 towing trailer 12, at a particular range of hitch angle γ, or the like.

Upon detecting a correct condition for continuing estimation routine 130, controller 28, in step 140, can receive a particular set of measurements relating to various dynamic parameters of the kinematic model. Such parameters can include steering angle δ, hitch angle γ, vehicle yaw rate ω1 and trailer yaw rate ω2, for example, depending on the particular embodiment of routine 130 used and the available and unknown measurements. Regardless of the particular measurements obtained, each such measurement is taken at the same instance in time such that each measurement corresponds to a set of measurements from the same time.

The measurements are received by controller 28 and stored, for example in memory 86, and are associated with each other according to the time with which they are associated. In this manner, a particular number of measurement sets can be taken to correspond with the number of unknown parameters in step 142 such that a number of equations based on the kinematic model can be derived to correspond to the number of unknowns in step 144. In this manner, a number of equations equal to the number of unknowns can be obtained such that controller 28, in step 146, can solve for the unknowns to obtain estimates therefor. The result is a complete kinematic model, where static values, such as drawbar length L and trailer length D can be stored in memory, and where dynamic values, such as γ can be calculated continuously using a simplified model such that controller 28 can use such values in a subsequent implementation of curvature routine 98. Controller 28 can solve the obtained equations for the unknown values using one or more known processes or algorithms for solving sets of equations for unknown variables, which may be included within the programming of controller 28 or otherwise embedded within the logic structure thereof. It is further noted that, as curvature routine 98 requires values for trailer length D and drawbar length L to be stored in memory 186, system 10 may require that vehicle 14 be driven without use of curvature routine 98 until such time that controller 28 has been able to execute estimation routine 130 to obtain acceptable estimates for such values.

Figure 5:
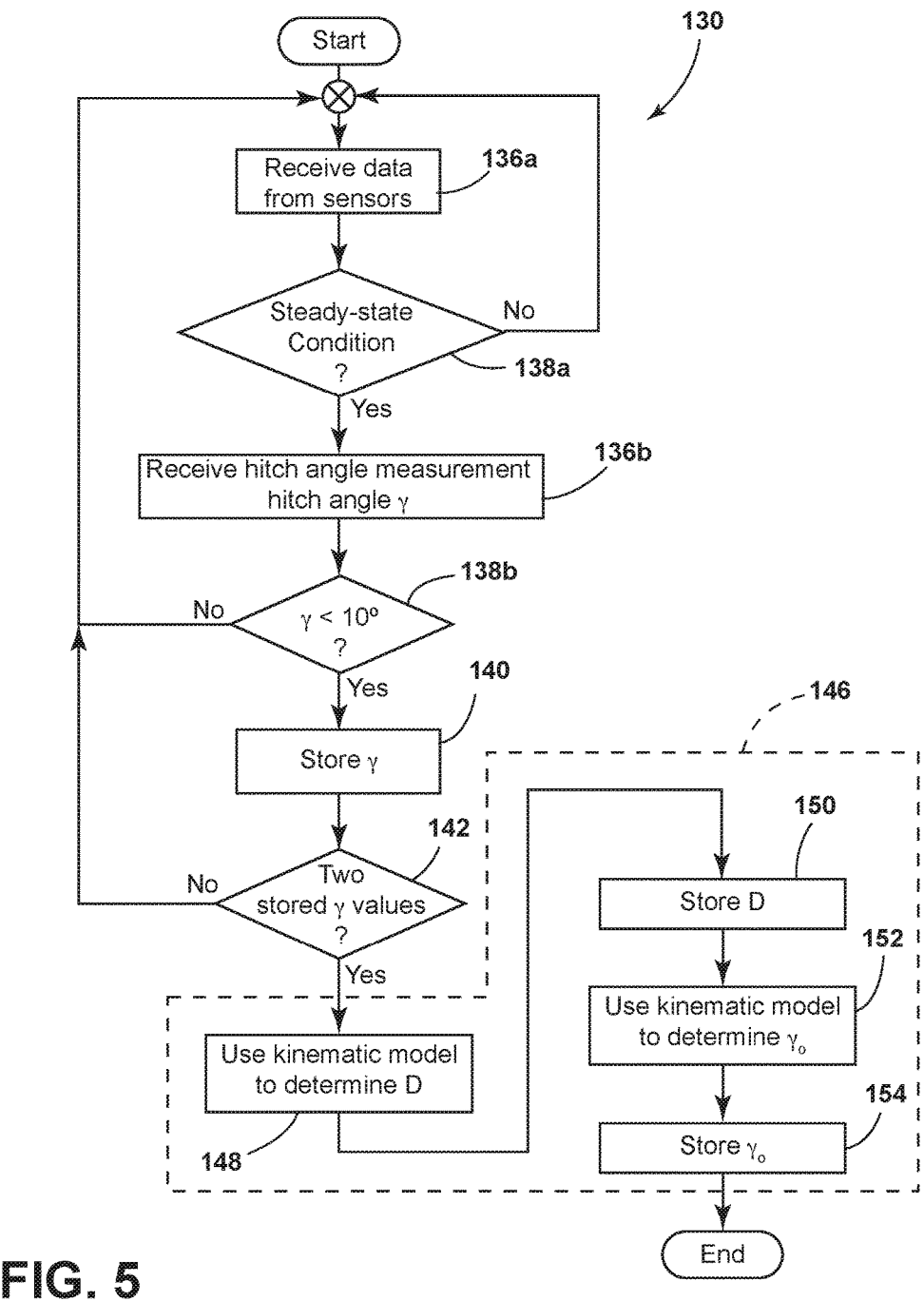
FIG. 5 is a flowchart depicting a variation of the process of FIG. 4 for determining a trailer length and a hitch angle offset.

As shown in FIG. 5, one particular implementation of the estimation routine 130 can be used to determine the hitch angle offset $\gamma_o$ and the trailer length D under two steady-state conditions for the hitch angle γ and the steering angle δ. In particular, using the kinematic model described above, the instantaneous hitch angle velocity $\dot{\gamma}$ can be:

$$\dot{\gamma} = \frac{d\gamma}{dt} = \frac{v}{D}\sin\gamma + \left(1 + \frac{L}{D}\cos\gamma\right)\frac{v}{W}\tan\delta.$$

In step 136a, controller 28 looks for conditions that indicate a steady-state for the hitch angle γ and for the steering angle δ, by which both the hitch angle velocity $\dot{\gamma}$ is determined to be zero for a predetermined interval and the steering angle δ is maintained constant. Under such conditions, it is, therefore, known that in the above equation $\dot{\gamma}=0$. Further, in step 138b controller 28 can look for a steady state condition with a low hitch angle γ, such as less than 10° (0.2 rad), which allows cos γ to be approximated as 1 and sin γ to be approximated as γ. By initially assuming these conditions to be true, and simplifying, it is determined that:

$$\tan\delta = \frac{-W\gamma}{L+D}.$$

Since the routine 130 in the present example is looking to determine the hitch angle offset, $\gamma_o$, the hitch angle γ in the above equation can be substituted with $\gamma_m-\gamma_o$, which can be solved for $\gamma_m$ as a function of tan δ to arrive at:

$$\gamma_m = \gamma_o - \left(\frac{L+D}{W}\right)\tan\delta.$$

By collecting and storing two separate steady-state, low-angle values for the hitch angle γ (steps 138a, 138b, 140, and 142), the kinematic model can be used to determine the unknown values in step 140. In particular, in step 148 the measured values can be considered data points in the above linear equation, wherein the hitch angle bias $\gamma_o$ is the Y-intercept and (L+W)/D is the slope. It is noted that such values should be taken such that the difference in the measurements is greater than any known errors or system noise. With the two data point sets, discussed above, noted as $\gamma_{m1}, \gamma_{m2}, \delta_1,$ and $\delta_2$, the above-equation can be re-written and solved for an estimate of (L+W)/D according to the following equation:

$$\left(\frac{L+W}{D}\right) \approx \left|\frac{\gamma_{m1} - \gamma_{m2}}{\delta_1 - \delta_2}\right|.$$

Accordingly, when the drawbar length L and the wheelbase W are known, the stored values for the measured hitch angle $\gamma_m$ and the steering angle $\delta$ can be used to determine an estimate of the trailer length D that can be stored in memory 186 (step 150). Again, using the kinematic model, an equation is derived for the hitch angle offset $\gamma_o$:

$$\gamma_o = \gamma_{m1} + \left(\frac{L+D}{W}\right)\tan\delta_1 = \gamma_{m2} + \left(\frac{L+D}{W}\right)\tan\delta_2.$$

Using this equation, the hitch angle offset $\gamma_o$ can be calculated in step 152 using the measured values for hitch angle $\gamma_m$ and the steering angle $\delta$, the known values for drawbar length L and wheelbase W, as well as the estimated trailer length D obtained in step 148. This value can be stored in memory 186 in step 154. In the alternative, the hitch angle offset $\gamma_o$ can be obtained by continuing to accumulate data points for the measured hitch angle $\gamma_m$ and the steering angle $\delta$ and averaging a sum of the above equations over time.

Figure 6:
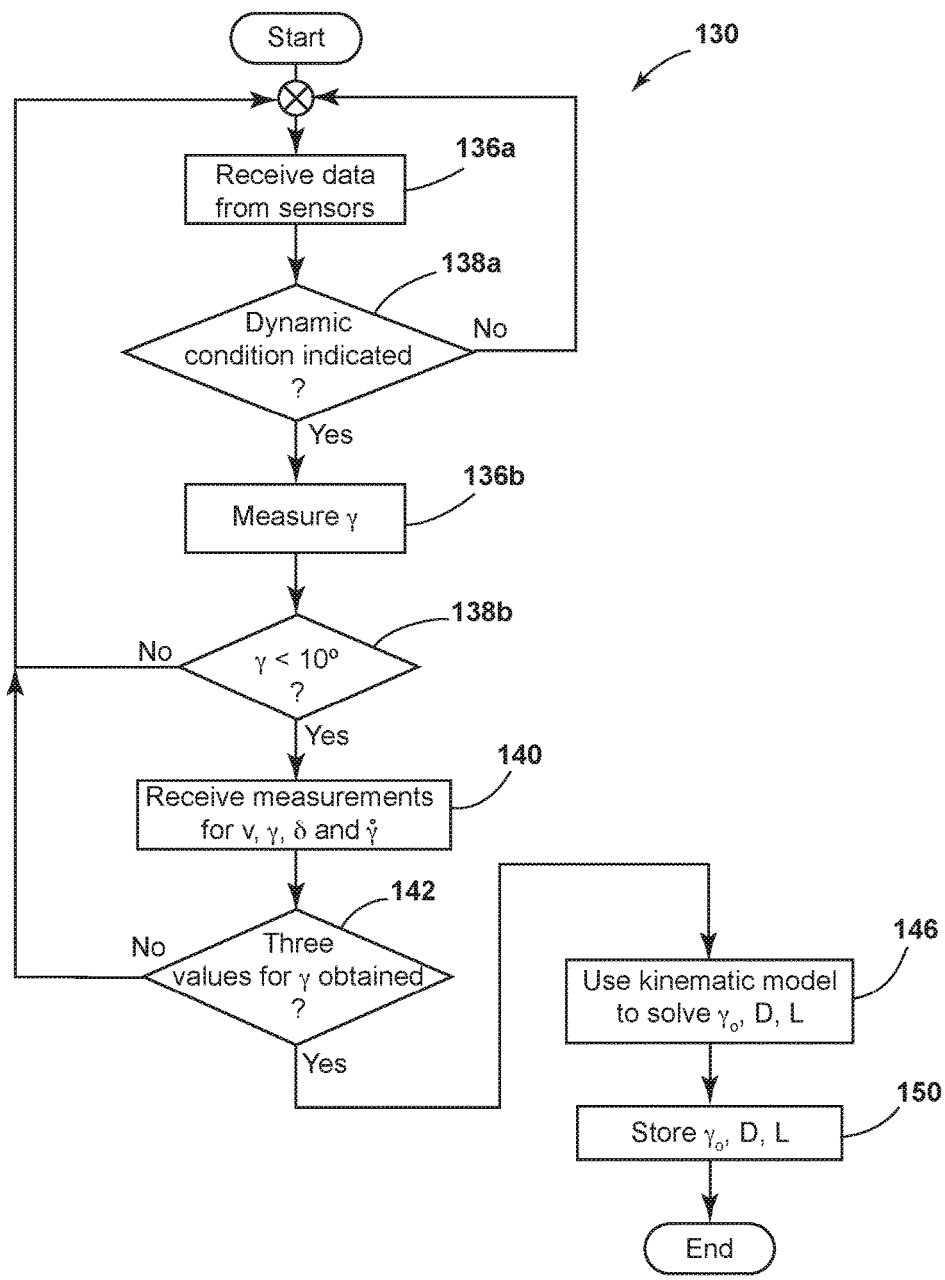
FIG. 6 is a flowchart depicting a variation of the process of FIG. 4 for determining a trailer length, a hitch angle offset, and a drawbar length.

In a variation of such a routine 130, as depicted in FIG. 6, controller 28 can look for dynamic, low hitch angle $\gamma$ conditions in steps 136, 138a, and 138b. Such a routine 130 can then take three measurements for each of hitch angle $\gamma_m$, the steering angle $\delta$, the hitch angle rate $\dot\gamma$, and the vehicle speed v. The measurement for hitch angle rate $\dot\gamma$ can be obtained by tracking the hitch angle $\gamma$ over a predetermined time interval, which may be less than one second. The hitch angle $\gamma_m$ measurement can be an average of the hitch angle throughout the time interval used to measure the hitch angle rate $\dot\gamma$. Alternatively, the measured hitch angle $\gamma_m$ can correspond to the hitch angle at the beginning, end, or a mid-point of the measurement used to determine the hitch angle rate $\dot\gamma$, assuming that for such low-angle conditions, any hitch angle acceleration will not negatively affect the hitch angle rate $\dot\gamma$ measurement. Once three sets of contemporaneous measurements have been received (steps 140 and 142), a further equation derived from the kinematic model that includes the dynamic conditions of hitch angle rate $\dot\gamma$ and vehicle speed v can be used to solve for the hitch angle offset, the trailer length D, and the drawbar length L. In particular, the equation is:

$$\gamma_m = \gamma_o - \left(\frac{L+D}{W}\right)\tan\delta + D\frac{\dot\gamma}{v}.$$

This equation can be solved for all three unknowns simultaneously, or can be solved for D and L first, with the hitch angle offset $\gamma_o$ as a variable. The hitch angle offset $\gamma_o$ can then be determined by an average of the sum of a dynamic kinematic model equation over a period of time according to the equation:

$$\gamma_o = \frac{1}{N}\sum_{i=1}^{N}\left[(\gamma_m)_i + \left(\frac{L+D}{W}\right)(\tan\delta)_i - D\left(\frac{\dot\gamma}{v}\right)\right].$$

In instances wherein the hitch angle offset $\gamma_o$ is determined as an average over time, the trailer length D and the drawbar length L can first be determined using two of the sets of contemporaneous measurements discussed above, with the hitch angle offset $\gamma_o$ being separately determined by the third set of measurements being subsequently taken over time. Further, in instances where the drawbar length L is known, two sets of contemporaneous measurements can be used to solve for trailer length D and hitch angle offset $\gamma_o$.

Figure 7:
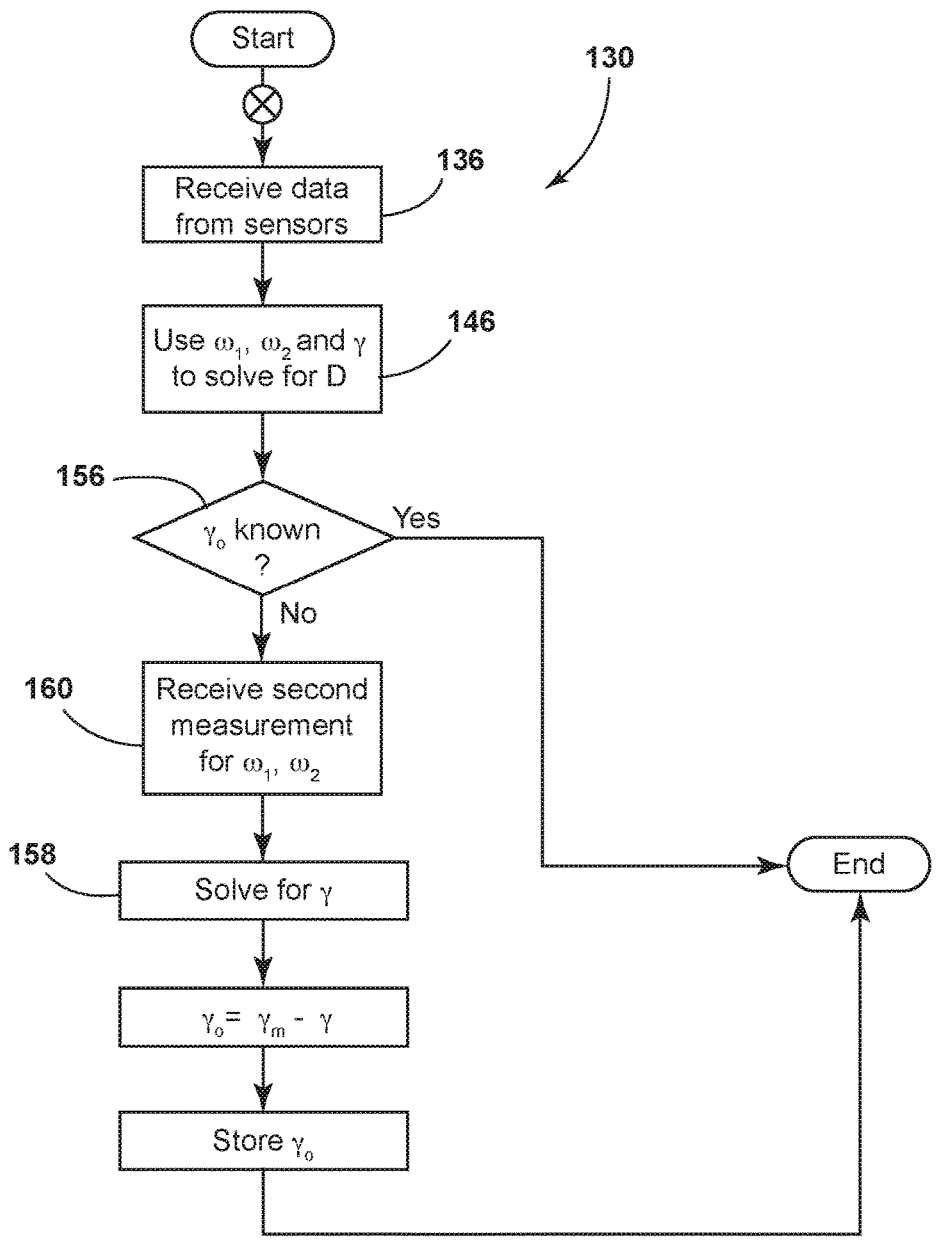
FIG. 7 is a flowchart depicting an alternative variation of the process of FIG. 4 for determining a trailer length and a hitch angle offset.

Turning now to FIG. 7, a further variation of estimation routine 130 is depicted in which the trailer length D, the drawbar length L, and the hitch angle offset $\gamma_o$, as needed using the vehicle yaw rate, the trailer yaw rate, the measured hitch angle $\gamma_m$ and the steering angle rate $d\delta/dt$ (or $\dot\delta$). The basis for the equation used for the estimates using these measurements is:

$$\frac{d\gamma}{d\delta} = \frac{(D + L\cos\gamma)(\sec\delta)^2}{W\cos\gamma + L\sin\gamma\tan\delta}.$$

Given that, in certain conditions, including low-angle conditions, tan $\delta$ and sin $\gamma$ can be approximated as zero and that sec $\delta$ and cos $\gamma$ can be approximated as 1, the equation can be approximated in a simplified form as:

$$\frac{d\gamma}{d\delta} = \frac{\frac{d\gamma}{dt}}{\frac{d\delta}{dt}} \approx \frac{(D + L\cos\gamma)}{W} \approx \left(\frac{D+L}{W}\right).$$

It is further known that the hitch angle rate $d\gamma/dt$ (or $\dot\gamma$) can be determined as the difference between the trailer yaw rate $\omega_2$ and the vehicle yaw rate $\omega_1$, the equation can be rewritten in terms of the trailer yaw rate $\omega_2$, the vehicle yaw rate $\omega_1$, and the hitch angle $\gamma$ as:

$$\omega_2 - \omega_1 \approx \frac{d\delta}{dt}\frac{(D + L\cos\gamma)}{W}.$$

This equation can be solved for D, with inputs for the trailer yaw rate $\omega_2$, the vehicle yaw rate and the measured hitch angle $\gamma_m$ (step 146a), if, for example, the offset is known (step 156) or negligible. Because the hitch angle $\gamma$ is equal to the sum of the measured hitch angle $\gamma_m$ and the hitch angle offset $\gamma_o$, the equation can be solved including for the hitch angle offset $\gamma_o$ using the measured hitch angle $\gamma_m$ (step 158). As discussed above, if the drawbar length L, for example, is known, then two sets of contemporaneous measurements for the vehicle yaw rate, the trailer yaw rate, the measured hitch angle $\gamma_m$ and the steering angle rate $d\delta/dt$ can be used (step 160) instead of three.

Figure 8:
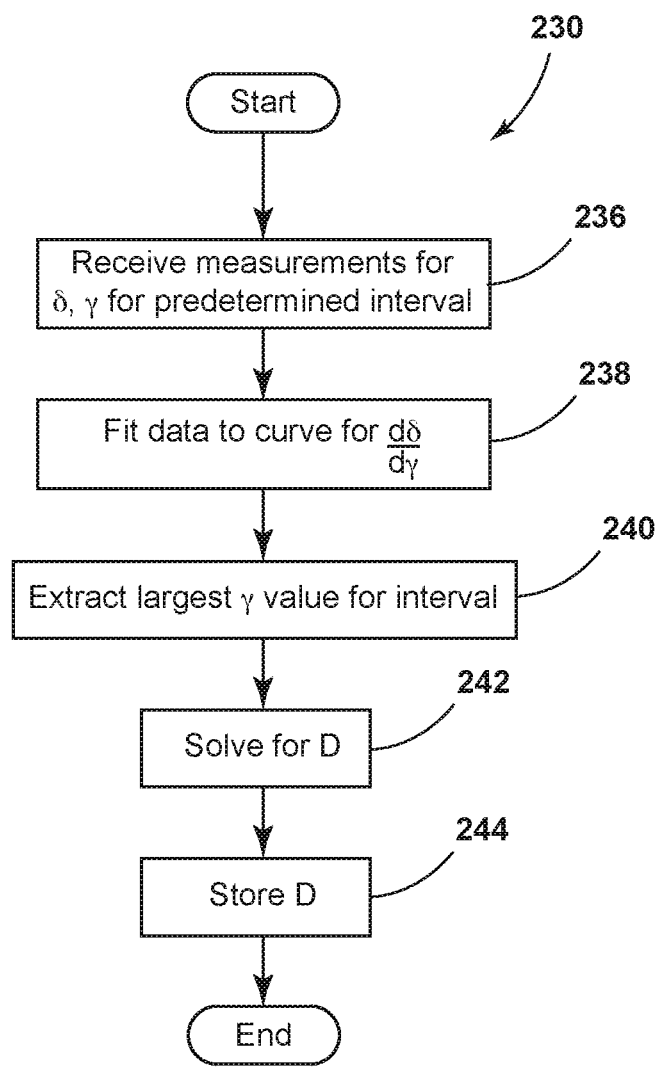
FIG. 8 is a flowchart depicting an alternative process for determining one or more unknown variables of the kinematic relationship that can be implemented by the trailer backup assist system.
Figure 9:
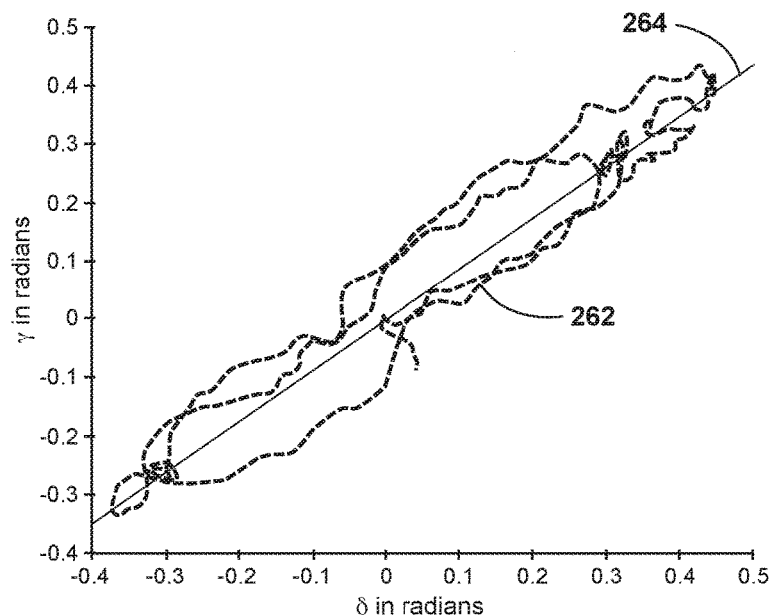
FIGS. 9 and 10 are graphs showing a linear curves fit to data sets obtained from vehicle and trailer sensors relating a hitch angle to a steering angle of a vehicle.
Figure 10:
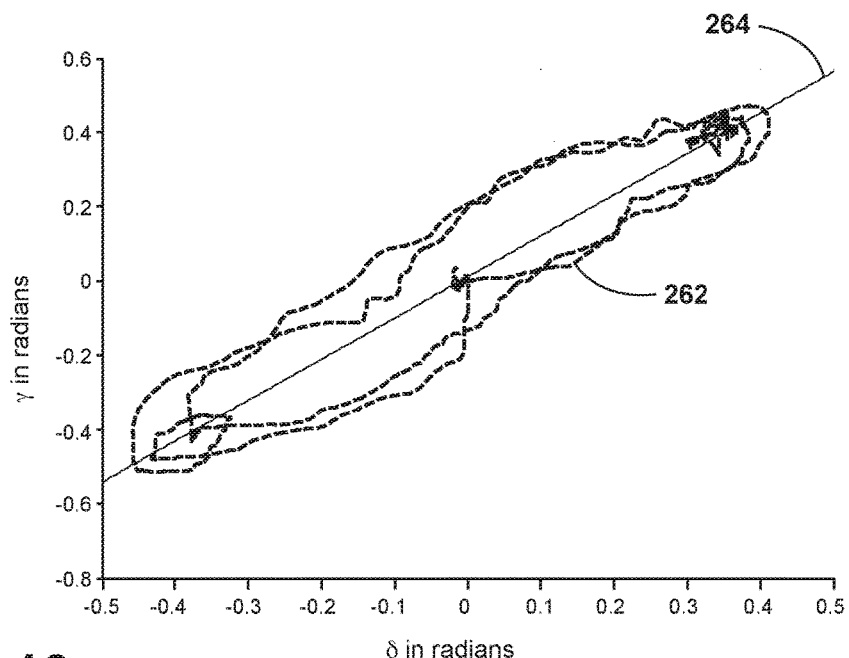
Figure 11:
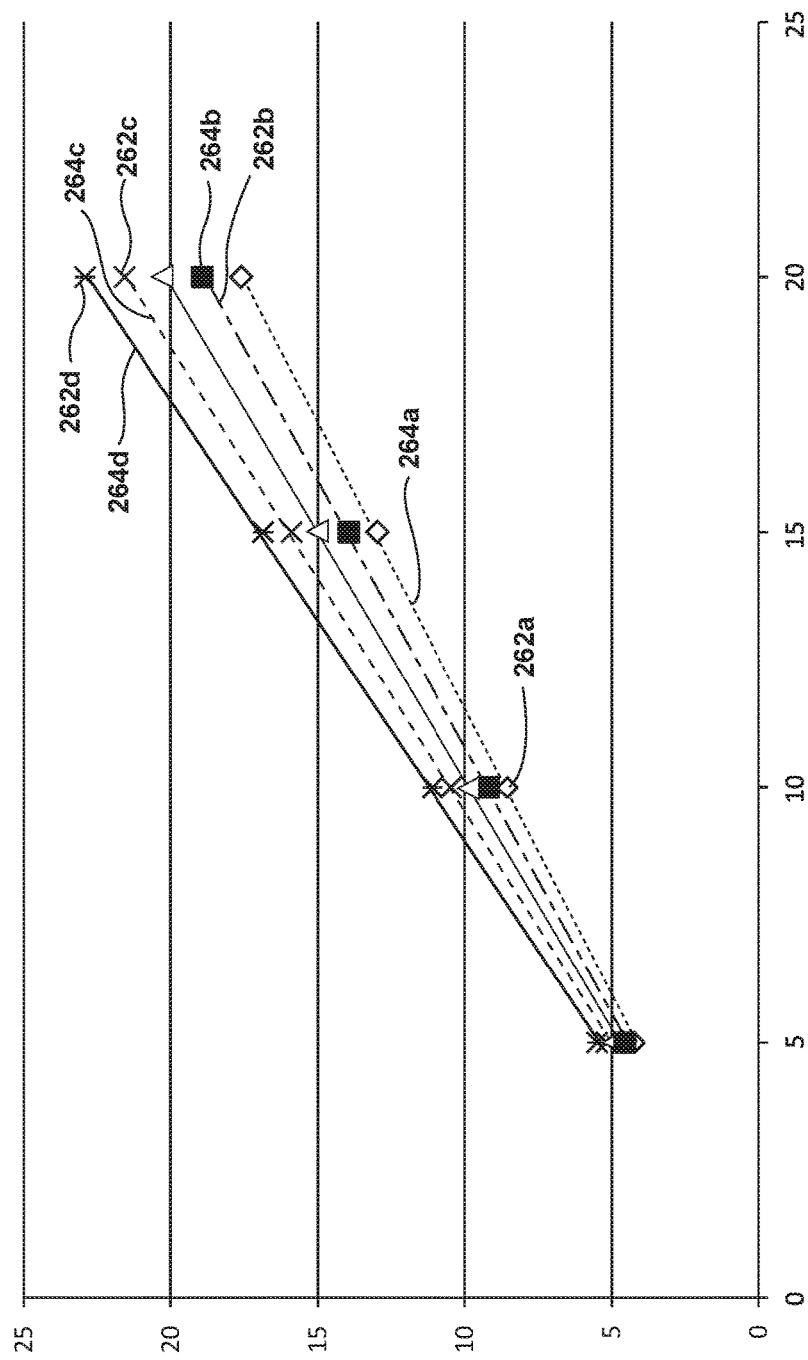
FIG. 11 is a graph depicting a relationship between the slope of a linear curve fit to data relating a hitch angle to a steering angle of a vehicle and increasing trailer length.

In another embodiment, an estimation routine 230 is shown in FIG. 8, in which the trailer length D can be calculated by measuring the hitch angle γ and the steering angle δ over a period of time (step 236) and using the collected measurements to estimate dγ/dδ, which can be used to solve for the trailer length D. In such an instance the number of measurements is inherently greater than the number of unknowns to be solved for, but can still be considered to correspond to the number of unknowns in that a certain number of measurements are desired based on the method of determining the unknown value. In the present instance, the controller 28 takes the data collected for the hitch angle γ and the steering angle δ and fits a linear curve to such data (step 238), as shown in FIGS. 9 and 10, for example, to estimate dγ/dδ by the slope of the line. As such, in one example, measurements may be taken for a predetermined number of instances or may be taken with a curve constantly fit to the collected data until a desired correlation coefficient is reached or until such a line appears to converge to a constant result.

As shown in FIG. 8, the estimation routine 230 can begin by receiving measurements for the steering angle δ and the hitch angle γ for an interval (step 236), which may be as described above. In step 238, controller 28 fits a curve to the accumulated data, an example of which is shown in FIG. 8, in which the hitch angle γ is plotted on the Y-axis against the steering angle γ on the X-axis, resulting in the data plot 262 depicted. The curve 268 determined by controller 28 to best fit the data is further illustrated. In one example, the kinematic model is used to derive the equation:

$$D \approx W \frac{d\gamma}{d\delta}.$$

This equation can be used to approximately solve for trailer length D, given the known wheelbase W. In another aspect, a more accurate result may be obtained using the equation:

$$D = W \frac{d\gamma}{d\delta} - L\cos\gamma.$$

Again, this equation can be used to determine the trailer length D, given known values for the drawbar length L and the wheelbase W (step 242), the determined trailer length D being subsequently stored in memory (step 244). In general, the measurement used for hitch angle γ can be the highest value therefor in the recorded data set. In a further example, a still more accurate result can be obtained by the equation:

$$\frac{d\gamma}{d\delta} = \frac{(D + L\cos\gamma)(\sec\delta)^2}{W\cos\gamma + L\sin\gamma\tan\delta}.$$

In this equation, the selected value for hitch angle γ can be the highest measured hitch angle in the data set and the steering angle δ used can be the value thereof corresponding to the selected hitch angle γ (step 240). In the example depicted in FIG. 8, the wheelbase D of vehicle 14 is about 4 meters and the drawbar length L is about 1.39 meters. The slope of the curve fit in the example of FIG. 8 is about 0.87. Using the highest value for the hitch angle, which is 0.2 radians, and the corresponding steering angle of 0.1 radians, the trailer length D can be approximated as 2.04 meters or about 2 meters. As depicted in FIG. 9, an increasing trailer length is shown as resulting in an increased value for dγ/dδ. In particular, the line 264a based on data 262a corresponding to the shortest trailer length D of 2 meters has the lowest slope. Lines 264b, 264c, and 264d based on data 262a, 262b, 262c, and 262d corresponding increasing trailer lengths D of 2.5, 2.75, and 3 meters have correspondingly increasing slopes.

Figure 12:
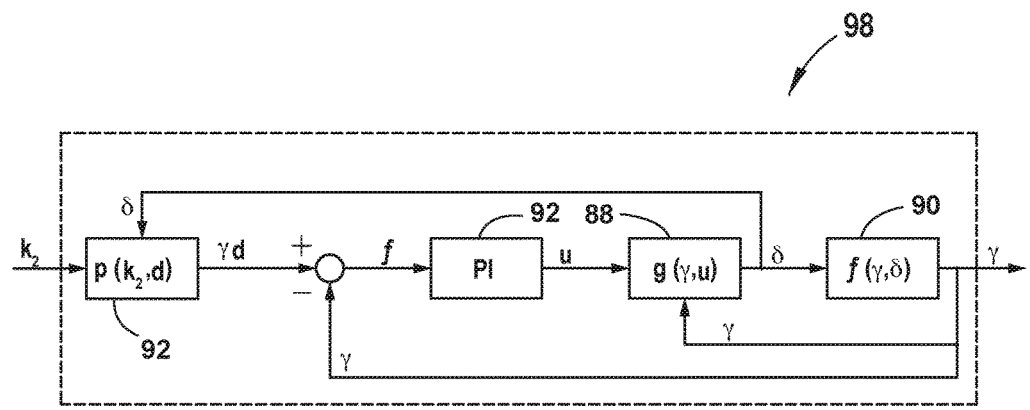
FIG. 12 is a schematic depiction of a control scheme for steering a trailer along a backing path.

An embodiment of the curvature routine 98 of the trailer backup assist system 10 is illustrated in FIG. 12, showing the general architectural layout whereby a measurement module 88, a hitch angle regulator 90, and a curvature regulator 92 are routines that may be stored in the memory 86 of the controller 28. In the illustrated layout, the steering input device 18 provides a desired curvature $\kappa_2$ value to the curvature regulator 92 of the controller 28, which may be determined from the desired backing path 26 that is input with the steering input device 18. The curvature regulator 92 computes a desired hitch angle γ(d) based on the current desired curvature $\kappa_2$ along with the steering angle δ provided by a measurement module 88 in this embodiment of the controller 28. The measurement module 88 may be a memory device separate from or integrated with the controller 28 that stores data from sensors of the trailer backup assist system 10, trailer sensor module 20, the vehicle speed sensor 58, the steering angle sensor, or alternatively the measurement module 88 may otherwise directly transmit data from the sensors without functioning as a memory device. Once the desired hitch angle γ(d) is computed by the curvature regulator 92 the hitch angle regulator 90 generates a steering angle command based on the computed desired hitch angle γ(d) as well as the measured hitch angle $\gamma_m$ or an otherwise estimated hitch angle γ and a current velocity v of the vehicle 14. The steering angle command is supplied to the power assist steering system 62 of the vehicle 14, which is then fed back to the measurement module 88 to reassess the impacts of other vehicle characteristics impacted from the implementation of the steering angle command or other changes to the system. Accordingly, the curvature regulator 92 and the hitch angle regulator 90 continually process information from the measurement module 88 to provide accurate steering angle commands that place the trailer 12 on the desired curvature $\kappa_2$ and the desired backing path 26, without substantial overshoot or continuous oscillation of the path of travel about the desired curvature $\kappa_2$.

Figure 13:
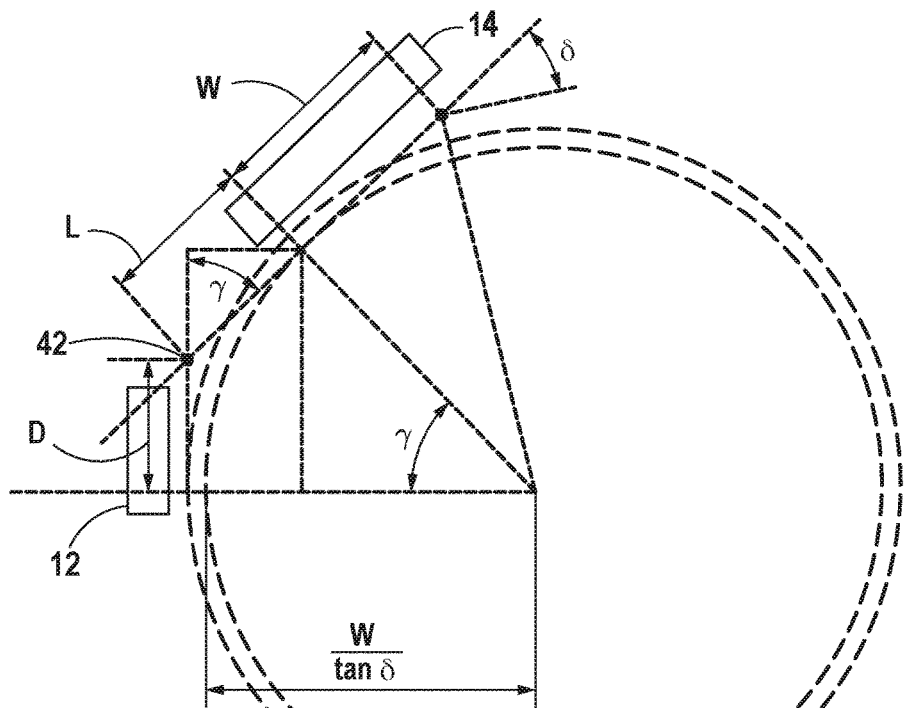
FIG. 13 diagram showing a relationship between a hitch angle and a steering angle of the vehicle as it relates to curvature of the trailer and a jackknife angle.

As also shown in FIG. 13, the embodiment of the curvature routine 98 shown in FIG. 12 is illustrated in a control system block diagram. Specifically, entering the control system is an input, $\kappa_2$, which represents the desired curvature 26 of the trailer 12 that is provided to the curvature regulator 92. The curvature regulator 92 can be expressed as a static map, $p(\kappa_2, \delta)$, which in one embodiment is the following equation:

$$p(\kappa_2, \delta) = \tan^{-1}\left(\frac{\kappa_2 D + L\tan(\delta)}{\kappa_2 DL\tan(\delta) - W}\right)$$

Where, $\kappa_2$ represents the desired curvature of the trailer 12 or $1/r_2$ as shown in FIG. 3;

δ represents the steering angle;

L represents the distance from the rear axle of the vehicle 14 to the hitch pivot point;

D represents the distance from the hitch pivot point to the axle of the trailer 12; and W represents the distance from the rear axle to the front axle of the vehicle 14.

With further reference to FIG. 13, the output hitch angle of $p(\kappa_2, \delta)$ is provided as the reference signal, $\gamma_{ref}$, for the remainder of the control system, although the steering angle $\delta$ value used by the curvature regulator 92 is feedback from the non-linear function of the hitch angle regulator 90. It is shown that the hitch angle regulator 90 uses feedback linearization for defining a feedback control law, as follows:

$$g(u, \gamma, v) = \delta = \tan^{-1}\left(\frac{W}{v\left(1 + \frac{L}{D}\cos(\gamma)\right)}\left(u - \frac{v}{D}\sin(\gamma)\right)\right).$$

As also shown in FIG. 12, the feedback control law, $g(u, \gamma, v)$, is implemented with a proportional integral (PI) controller, whereby the integral portion substantially eliminates steady-state tracking error. More specifically, the control system illustrated in FIG. 12 may be expressed as the following differential-algebraic equations:

$$\dot{\gamma}(t) = \frac{v(t)}{D}\sin(\gamma(t)) + \left(1 + \frac{L}{D}\cos(\gamma(t))\right)\frac{v(t)}{W}\overline{\delta} \text{ and}$$

$$\tan(\delta) = \overline{\delta} = \frac{W}{v(t)\left(1 + \frac{L}{D}\cos(\gamma(t))\right)}\left(K_P(p(\kappa_2, \delta) - \gamma(t)) - \frac{v(t)}{D}\sin(\gamma(t))\right).$$

It is contemplated that the PI controller may have gain terms based on trailer length D since shorter trailers will generally have faster dynamics. In addition, the hitch angle regulator 90 may be configured to prevent the desired hitch angle $\gamma(d)$ to reach or exceed a jackknife angle $\gamma(j)$, as computed by the controller or otherwise determined by the trailer backup assist system 10, as disclosed in greater detail herein.

Referring now to FIG. 13, in the illustrated embodiments of the disclosed subject matter, it is desirable to limit the potential for the vehicle 14 and the trailer 12 to attain a jackknife angle (i.e., the vehicle/trailer system achieving a jackknife condition). A jackknife angle $\gamma(j)$ refers to a hitch angle $\gamma$ that while backing cannot be overcome by the maximum steering input for a vehicle such as, for example, the steered front wheels of the vehicle 14 being moved to a maximum steered angle $\delta$ at a maximum rate of steering angle change. The jackknife angle $\gamma(j)$ is a function of a maximum wheel angle for the steered wheels of the vehicle 14, the wheel base W of the vehicle 14, the distance L between hitch point and the rear axle of the vehicle 14, and the trailer length D between the hitch point and the axle of the trailer 12 or the effective axle when the trailer 12 has multiple axles. When the hitch angle $\gamma$ for the vehicle 14 and the trailer 12 achieves or exceeds the jackknife angle $\gamma(j)$, the vehicle 14 may be pulled forward to reduce the hitch angle $\gamma$. Thus, for limiting the potential for a vehicle/trailer system attaining a jackknife angle, it is preferable to control the yaw angle of the trailer 12 while keeping the hitch angle $\gamma$ of the vehicle/trailer system relatively small.

A kinematic model representation of the vehicle 14 and the trailer 12 can also be used to determine a jackknife angle for the vehicle-trailer combination. Accordingly, with reference to FIG. 13, a steering angle limit for the steered front wheels requires that the hitch angle $\gamma$ cannot exceed the jackknife angle $\gamma(j)$, which is also referred to as a critical hitch angle $\gamma$. Thus, under the limitation that the hitch angle $\gamma$ cannot exceed the jackknife angle $\gamma(j)$, the jackknife angle $\gamma(j)$ is the hitch angle $\gamma$ that maintains a circular motion for the vehicle/trailer system when the steered wheels 64 are at a maximum steering angle $\delta_{(max)}$. The steering angle for circular motion with hitch angle $\gamma$ is defined by the following equation.

$$\tan\delta_{max} = \frac{w\sin\gamma_{max}}{D + L\cos\gamma_{max}}.$$

Solving the above equation for hitch angle $\gamma$ allows jackknife angle $\gamma(j)$ to be determined. This solution, which is shown in the following equation, can be used in implementing trailer backup assist functionality in accordance with the disclosed subject matter for monitoring hitch angle $\gamma$ in relation to jackknife angle.

$$\cos\overline{\gamma} = \frac{-b \pm \sqrt{b^2 - 4ac}}{2a}$$

where, $a = L^2 \tan^2 \delta(max) + W^2$;

$b = 2 LD \tan^2 \delta(max)$; and $c = D^2 \tan^2 \delta(max) - W^2$.

In certain instances of backing the trailer 12, a jackknife enabling condition can arise based on current operating parameters of the vehicle 14 in combination with a corresponding hitch angle $\gamma$. This condition can be indicated when one or more specified vehicle operating thresholds are met while a particular hitch angle $\gamma$ is present. For example, although the particular hitch angle $\gamma$ is not currently at the jackknife angle for the vehicle 14 and attached trailer 12, certain vehicle operating parameters can lead to a rapid (e.g., uncontrolled) transition of the hitch angle $\gamma$ to the jackknife angle for a current commanded trailer curvature and/or can reduce an ability to steer the trailer 12 away from the jackknife angle. One reason for a jackknife enabling condition is that trailer curvature control mechanisms (e.g., those in accordance with the disclosed subject matter) generally calculate steering commands at an instantaneous point in time during backing of a trailer 12. However, these calculations will typically not account for lag in the steering control system of the vehicle 14 (e.g., lag in a steering EPAS controller). Another reason for the jackknife enabling condition is that trailer curvature control mechanisms generally exhibit reduced steering sensitivity and/or effectiveness when the vehicle 14 is at relatively high speeds and/or when undergoing relatively high acceleration.

Jackknife determining information may be received by the controller 28, according to one embodiment, to process and characterize a jackknife enabling condition of the vehicle-trailer combination at a particular point in time (e.g., at the point in time when the jackknife determining information was sampled). Examples of the jackknife determining information include, but are not limited to, information characterizing an estimated hitch angle $\gamma$, information characterizing a vehicle accelerator pedal transient state, information characterizing a speed of the vehicle 14, information characterizing longitudinal acceleration of the vehicle 14, information characterizing a brake torque being applied by a brake system of the vehicle 14, information characterizing a powertrain torque being applied to driven wheels of the vehicle 14, and information characterizing the magnitude and rate of driver requested trailer curvature. In this regard, jackknife determining information would be continually monitored, such as by an electronic control unit (ECU) that carries out trailer backup assist (TBA) functionality. After receiving the jackknife determining information, a routine may process the jackknife determining information for determining if the vehicle-trailer combination attained the jackknife enabling condition at the particular point in time. The objective of the operation for assessing the jackknife determining information is determining if a jackknife enabling condition has been attained at the point in time defined by the jackknife determining information. If it is determined that a jackknife enabling condition is present at the particular point in time, a routine may also determine an applicable countermeasure or countermeasures to implement. Accordingly, in some embodiments, an applicable countermeasure will be selected dependent upon a parameter identified as being a key influencer of the jackknife enabling condition. However, in other embodiments, an applicable countermeasure will be selected as being most able to readily alleviate the jackknife enabling condition. In still another embodiment, a predefined countermeasure or predefined set of countermeasures may be the applicable countermeasure(s).

As previously disclosed with reference to the illustrated embodiments, during operation of the trailer backup assist system 10, a driver of the vehicle 14 may be limited in the manner in which steering inputs may be made with the steering wheel 68 of the vehicle 14 due to the power assist steering system 62 being directly coupled to the steering wheel 68. Accordingly, the steering input device 18 of the trailer backup assist system 10 may be used for inputting a desired curvature 26 of the trailer 12, thereby decoupling such commands from being made at the steering wheel 68 of the vehicle 14. However, additional embodiments of the trailer backup assist system 10 may have the capability to selectively decouple the steering wheel 68 from movement of steerable wheels of the vehicle 14, thereby allowing the steering wheel 68 to be used for commanding changes in the desired curvature 26 of a trailer 12 or otherwise selecting a desired backing path during such trailer backup assist.

Figure 14:
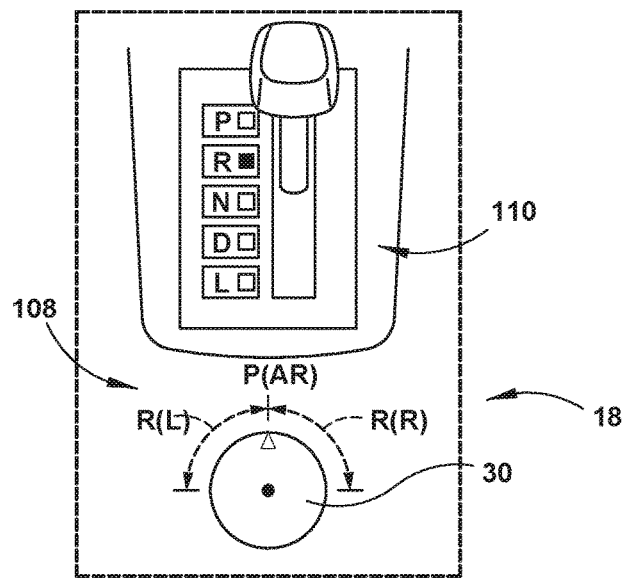
FIG. 14 is a plan view of a steering input device having a rotatable knob for operating the trailer backup assist system, according to one embodiment.

Referring now to FIG. 14, one embodiment of the steering input device 18 is illustrated disposed on a center console 108 of the vehicle 14 proximate a shifter 110. In this embodiment, the steering input device 18 includes a rotatable knob 30 for providing the controller 28 with the desired backing path of the trailer 12. More specifically, the angular position of the rotatable knob 30 may correlate with a desired curvature, such that rotation of the knob to a different angular position provides a different desired curvature with an incremental change based on the amount of rotation and, in some embodiments, a normalized rate, as described in greater detail herein.

Figure 15:
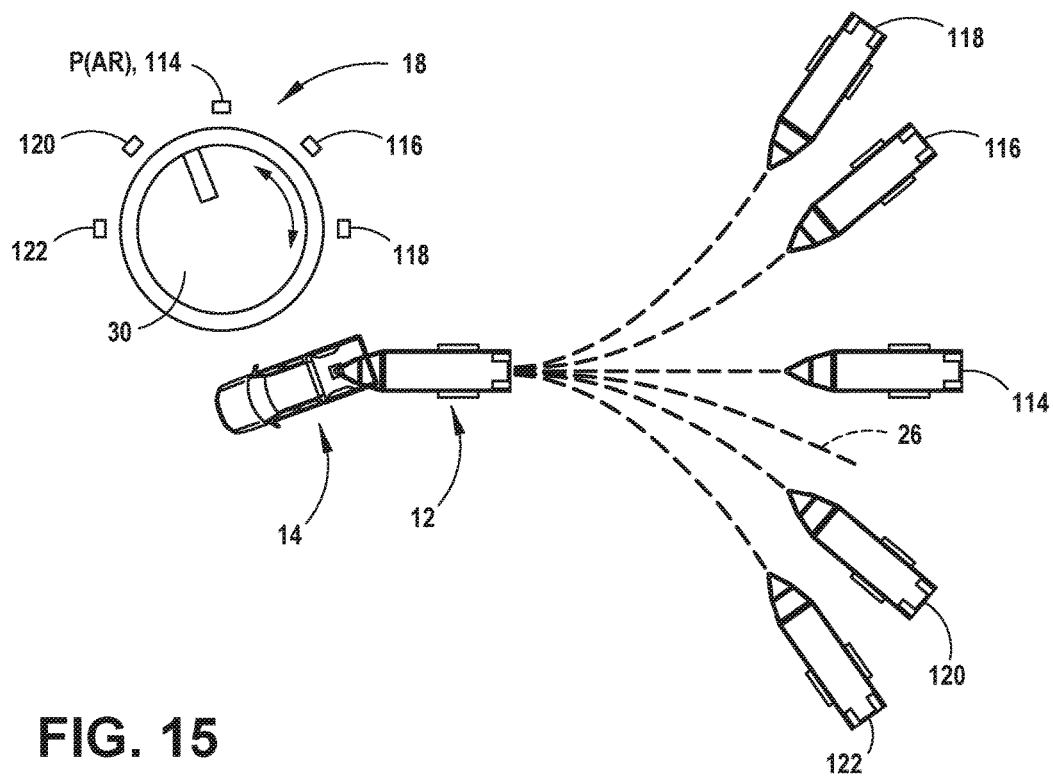
FIG. 15 is a plan view of another embodiment of a rotatable knob for selecting a desired curvature of a trailer and a corresponding schematic diagram illustrating a vehicle and a trailer with various trailer curvature paths correlating with desired curvatures that may be selected.

The rotatable knob 30, as illustrated in FIGS. 14 and 15, may be biased (e.g., by a spring return) to a center or at-rest position P(AR) between opposing rotational ranges of motion R(R), R(L). In the illustrated embodiment, a first one of the opposing rotational ranges of motion R(R) is substantially equal to a second one of the opposing rotational ranges of motion R(L), R(R). To provide a tactile indication of an amount of rotation of the rotatable knob 30, a force that biases the knob toward the at-rest position P(AR) can increase (e.g., non-linearly) as a function of the amount of rotation of the rotatable knob 30 with respect to the at-rest position P(AR). Additionally, the rotatable knob 30 can be configured with position indicating detents such that the driver can positively feel the at-rest position P(AR) and feel the ends of the opposing rotational ranges of motion R(L), R(R) approaching (e.g., soft end stops). The rotatable knob 30 may generate a desired curvature value as a function of an amount of rotation of the rotatable knob 30 with respect to the at-rest position P(AR) and a direction of movement of the rotatable knob 30 with respect to the at-rest position P(AR). It is also contemplated that the rate of rotation of the rotatable knob 30 may also be used to determine the desired curvature output to the controller 28. The at-rest position P(AR) of the knob corresponds to a signal indicating that the vehicle 14 should be steered such that the trailer 12 is backed along a substantially straight backing path 114 (zero trailer curvature request from the driver), as defined by the longitudinal direction 22 of the trailer 12 when the knob was returned to the at-rest position P(AR). A maximum clockwise and anti-clockwise position of the knob (i.e., limits of the opposing rotational ranges of motion R(R), R(L)) may each correspond to a respective signal indicating a tightest radius of curvature (i.e., most acute trajectory or smallest radius of curvature) of a path of travel of the trailer 12 that is possible without the corresponding vehicle steering information causing a jackknife condition.

As shown in FIG. 15, a driver can turn the rotatable knob 30 to provide a desired curvature 26 while the driver of the vehicle 14 backs the trailer 12. In the illustrated embodiment, the rotatable knob 30 rotates about a central axis between a center or middle position 114 corresponding to a substantially straight backing path 26 of travel, as defined by the longitudinal direction 22 of the trailer 12, and various rotated positions 116, 118, 120, 122 on opposing sides of the middle position 114, commanding a desired curvature 26 corresponding to a radius of the desired backing path of travel for the trailer 12 at the commanded rotated position. It is contemplated that the rotatable knob 30 may be configured in accordance with embodiments of the disclosed subject matter and omit a means for being biased to an at-rest position P(AR) between opposing rotational ranges of motion. Lack of such biasing may allow a current rotational position of the rotatable knob 30 to be maintained until the rotational control input device is manually moved to a different position. It is also conceivable that the steering input device 18 may include a non-rotational control device that may be configured to selectively provide a desired curvature 26 and to override or supplement an existing curvature value. Examples of such a non-rotational control input device include, but are not limited to, a plurality of depressible buttons (e.g., curve left, curve right, and travel straight), a touch screen on which a driver traces or otherwise inputs a curvature for path of travel commands, a button that is translatable along an axis for allowing a driver to input backing path commands, or a joystick type input and the like.

Figure 16:
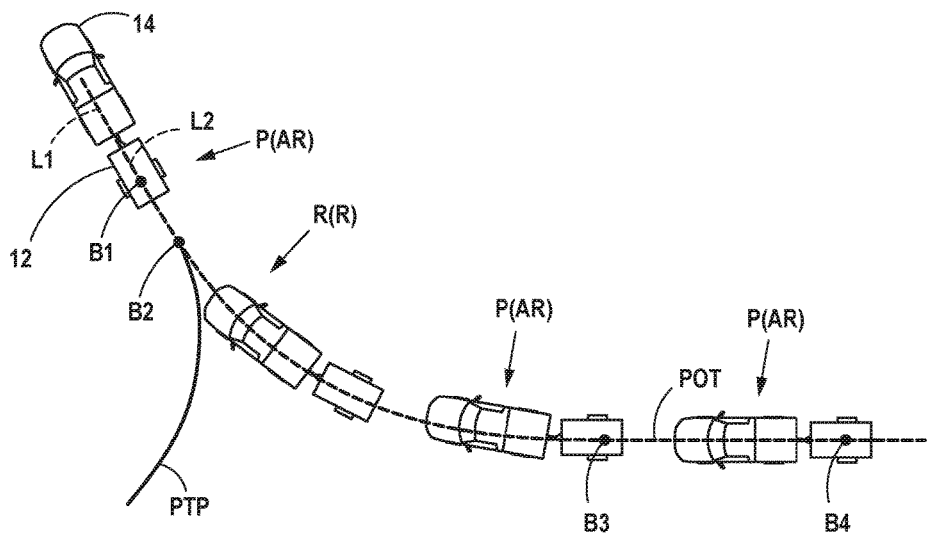
FIG. 16 is a schematic diagram showing a backup sequence of a vehicle and a trailer implementing various curvature selections with the trailer backup assist system, according to one embodiment.

Referring to FIG. 16, an example of using the steering input device 18 for dictating a curvature of a desired backing path of travel (POT) of the trailer 12 while backing up the trailer 12 with the vehicle 14 is shown. In preparation of backing the trailer 12, the driver of the vehicle 14 may drive the vehicle 14 forward along a pull-thru path (PTP) to position the vehicle 14 and trailer 12 at a first backup position B1. In the first backup position B1, the vehicle 14 and trailer 12 are longitudinally aligned with each other such that a longitudinal centerline axis L1 of the vehicle 14 is aligned with (e.g., parallel with or coincidental with) a longitudinal centerline axis L2 of the trailer 12. It is disclosed herein that such alignment of the longitudinal axis L1, L2 at the onset of an instance of trailer backup functionality is not a requirement for operability of a trailer backup assist system 10, but may be done for calibration.

After activating the trailer backup assist system 10 (e.g., before, after, or during the pull-thru sequence), the driver begins to back the trailer 12 by reversing the vehicle 14 from the first backup position B1. So long as the rotatable knob 30 of the trailer backup steering input device 18 remains in the at-rest position P(AR) and no other steering input devices 18 are activated, the trailer backup assist system 10 will steer the vehicle 14 as necessary for causing the trailer 12 to be backed along a substantially straight path of travel, as defined by the longitudinal direction 22 of the trailer 12, specifically the centerline axis L2 of the trailer 12, at the time when backing of the trailer 12 began. When the trailer 12 reaches the second backup position B2, the driver rotates the rotatable knob 30 to command the trailer 12 to be steered to the right (i.e., a knob position R(R) clockwise rotation). Accordingly, the trailer backup assist system 10 will steer the vehicle 14 for causing the trailer 12 to be steered to the right as a function of an amount of rotation of the rotatable knob 30 with respect to the at-rest position P(AR), a rate movement of the knob, and/or a direction of movement of the knob 30 with respect to the at-rest position P(AR). Similarly, the trailer 12 can be commanded to steer to the left by rotating the rotatable knob 30 to the left. When the trailer 12 reaches backup position B3, the driver allows the rotatable knob 30 to return to the at-rest position P(AR) thereby causing the trailer backup assist system 10 to steer the vehicle 14 as necessary for causing the trailer 12 to be backed along a substantially straight path of travel as defined by the longitudinal centerline axis L2 of the trailer 12 at the time when the rotatable knob 30 was returned to the at-rest position P(AR). Thereafter, the trailer backup assist system 10 steers the vehicle 14 as necessary for causing the trailer 12 to be backed along this substantially straight path to the fourth backup position B4. In this regard, arcuate portions of a path of travel POT of the trailer 12 are dictated by rotation of the rotatable knob 30 and straight portions of the path of travel POT are dictated by an orientation of the centerline longitudinal axis L2 of the trailer 12 when the knob is in/returned to the at-rest position P(AR).

In the embodiment illustrated in FIG. 16, in order to activate the trailer backup assist system 10, the driver interacts with the trailer backup assist system 10 and automatically steers as the driver reverses the vehicle 14. As discussed above, the driver may command the trailer backing path by using a steering input device 18 and the controller 28 may determine the vehicle steering angle to achieve the desired curvature 26, whereby the driver controls the throttle and brake while the trailer backup assist system 10 controls the steering.

Figure 17:
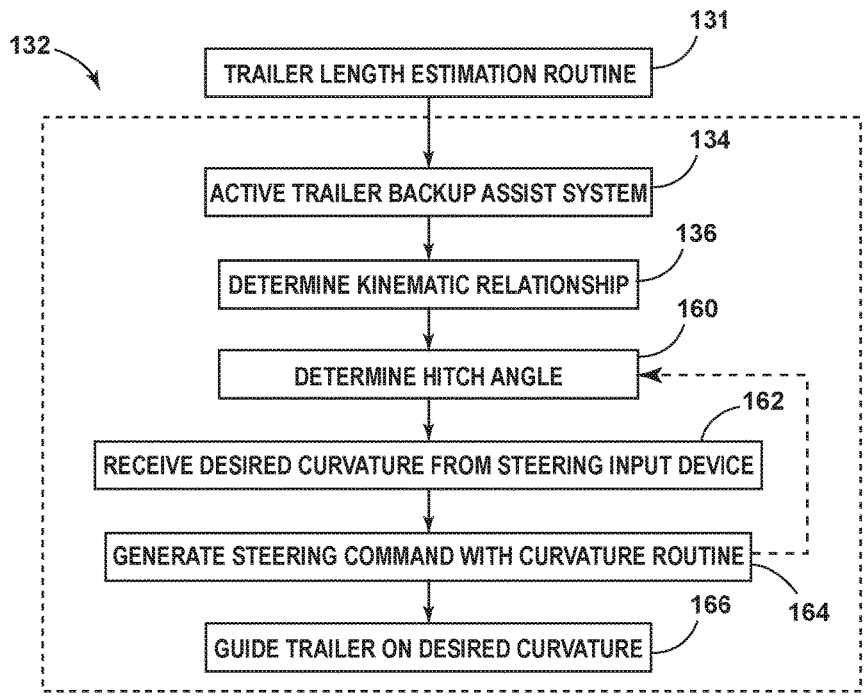
FIG. 17 is a flow diagram illustrating a method of operating a trailer backup assist system using an operating routine for steering a vehicle reversing a trailer with normalized control of the desired curvature, according to one embodiment.

With reference to FIG. 17, a method of operating one embodiment of the trailer backup assist system 10 is illustrated, shown as one embodiment of the operating routine 132 (FIG. 2). In one aspect, system 10 can be configured to lock out or deactivate operating routine 132 until estimates at least one of a trailer length D, draw bar length L, hitch angle offset $\gamma_o$, or the like has been obtained in step 131 (discussed further above with reference to FIG. 4). After the required parameters have been estimated or otherwise determined, operating routine 132 is allowed to be initiated, as requested by a user, in step 134 (FIG. 17), as discussed above, using the trailer length D, drawbar length L, and/or hitch angle offset $\gamma_o$ in the kinematic model and the various equations used in operating routine 132 derived therefrom.

At step 134, the method is initiated by the trailer backup assist system 10 being activated. It is contemplated that this may be done in a variety of ways, such by making a selection on the display 82 of the vehicle HMI 80. The next step 136, then determines the kinematic relationship between the attached trailer 12 and the vehicle 14. To determine the kinematic relationship, various parameters of the vehicle 14 and the trailer 12 must be sensed, input by the driver, or otherwise determined for the trailer backup assist system 10 to generate steering commands to the power assist steering system 62 in accordance with the desired curvature or backing path 26 of the trailer 12, as discussed above with reference to FIGS. 1-3

In one aspect, after the kinematic relationship is determined, the trailer backup assist system 10 may proceed at step 160 to determine the current hitch angle, which can be done using a hitch angle sensor 44, as described above or by various calculations or estimations based on the kinematic model. Operating routine 132 continues at step 162 in which the position and rate of change is received from the steering input device 18, such as the angular position and rate of rotation of the rotatable knob 30, for determining the desired curvature 26. At step 164, steering commands may be generated based on the desired curvature, correlating with the position and rate of change of the steering input device 18. The steering commands and actuation commands generated may be generated in conjunction with processing of the curvature routine 98, as previous discussed. At step 166, the steering commands and actuation commands have been executed to guide the trailer 12 on the desired curvature provided by the steering input device 18.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A backup assist system for a vehicle and trailer combination, comprising:
    a steering system;
    a first sensor detecting a first dynamic condition of the combination; and
    a controller:
        receiving a value for the first dynamic condition from the first sensor at a plurality of instances;
        solving for a corresponding plurality of parameters in a kinematic model of the combination; and
        controlling the steering system using the plurality of parameters in the kinematic model.

2. The backup assist system of claim 1, wherein:
    the first sensor is a hitch angle sensor;
    the first dynamic condition is a hitch angle between the vehicle and the trailer;
    the system further includes a second sensor comprising a steering angle sensor determining a steering angle of the steering system; and
    the controller further receives a plurality of values for the steering angle for each of the plurality of instances.

3. The backup assist system of claim 2, wherein:
    the plurality of instances includes two instances; and
    the plurality of parameters solved for include a trailer length and a hitch angle bias.

4. The backup assist system of claim 3, wherein the two instances indicate a steady state condition of the combination.

5. The backup assist system of claim 3, wherein the two instances each include a hitch angle of less than 10°.

6. The backup assist system of claim 2, wherein:
    the plurality of instances includes three instances; and
    the plurality of parameters solved for include a trailer length, a drawbar length, and a hitch angle bias.

7. The backup assist system of claim 2, wherein:
    the controller uses the values received for the hitch angle and the steering angle to fit a linear curve to the hitch angle values against the steering angle values, the linear curve correlating with a rate of change of the steering angle over a rate of change of the hitch angle; and
    the controller solves for a trailer length using the rate of change of the steering angle over a rate of change of the hitch angle in the kinematic model.

8. The backup assist system of claim 1, wherein:
    the first sensor is a yaw rate sensor of the trailer;
    the first dynamic condition is a yaw rate of the trailer;
    the system further includes a second sensor comprising a vehicle yaw rate sensor determining a yaw rate of the vehicle; and
    the controller further receives a plurality of values for the vehicle yaw rate for each of the plurality of instances.

9. The backup assist system of claim 8, wherein:
    the plurality of instances includes two instances; and
    the plurality of parameters solved for include a trailer length and a hitch angle bias.

10. The backup assist system of claim 1, wherein controlling the steering system using the plurality of parameters in the kinematic model includes determining a steering angle according to a curvature command.

11. A vehicle, comprising:
    a steering system;
    a first sensor detecting a first dynamic condition of at least one of the vehicle and the vehicle in a combination with a trailer; and
    a trailer backup assist system, comprising a controller:
        receiving a value for the first dynamic condition from the first sensor in at least one instance;
        solving for at least one parameter corresponding in number to the at least one instance in a kinematic model of the combination; and
        controlling the steering system using the at least one parameter in the kinematic model.

12. The vehicle of claim 11, further including a second sensor comprising a steering angle sensor determining a steering angle of the steering system, wherein:
    the first sensor is a hitch angle sensor;
    the first dynamic condition is a hitch angle between the vehicle and the trailer; and
    the controller of the trailer backup assist system further receives at least one value for the steering angle for each of the at least one instance.

13. The vehicle of claim 12, wherein:
    the at least one instance includes two instances; and
    the at least one parameter solved for includes a trailer length and a hitch angle bias.

14. The vehicle of claim 12, wherein:
    the controller uses the values received for the hitch angle and the steering angle to fit a linear curve to the hitch angle values against the steering angle values, the linear curve correlating with a rate of change of the steering angle over a rate of change of the hitch angle; and
    the controller solves for a trailer length using the rate of change of the steering angle over a rate of change of the hitch angle in the kinematic model.

15. The vehicle of claim 11, wherein:
    the first sensor is a yaw rate sensor of the trailer;
    the first dynamic condition is a yaw rate of the trailer;
    the vehicle further includes a second sensor comprising a vehicle yaw rate sensor determining a yaw rate of the vehicle;
    the controller further receives a plurality of values for the vehicle yaw rate for each of the at least one instance; and
    the at least one parameter solved for includes a trailer length and a hitch angle.

16. A method for assisting a vehicle in reversing a trailer, comprising:
- determining unknown values for a plurality of parameters in a combination of the vehicle and the trailer, including:
  - receiving a first measurement for a first dynamic condition of the combination at a plurality of instances; and
  - solving for the parameters in a kinematic model of the combination; and
- implementing a reversing operation including controlling a vehicle steering system using the plurality of parameters.

17. The method of claim 16, wherein:
the first dynamic condition is a hitch angle between the vehicle and the trailer; and determining the unknown values further includes receiving a second measurement for a steering angle of the steering system at the plurality of instances.

18. The method of claim 17, wherein:
the plurality of instances includes two instances; and
the plurality of parameters solved for include a trailer length and a hitch angle bias.

19. The method of claim 17, wherein solving for the parameters in the kinematic model of the combination includes:
- using the values received for the hitch angle and the steering angle to fit a linear curve to the hitch angle values against the steering angle values, the linear curve correlating with a rate of change of the steering angle over a rate of change of the hitch angle; and
- solving for a trailer length using the rate of change of the steering angle over a rate of change of the hitch angle in the kinematic model.

20. The method of claim 16, wherein:
the first dynamic condition is a yaw rate of the trailer;
determining the unknown values further includes receiving a second measurement for a yaw rate of the vehicle for each of the plurality of instances; and
the plurality of parameters solved for include a trailer length and a hitch angle.

\* \* \* \* \*